(12) United States Patent
Park

(10) Patent No.: US 12,214,749 B2
(45) Date of Patent: Feb. 4, 2025

(54) GLOVE BOX

(71) Applicant: HYUNDAI MOBIS Co., Ltd., Seoul (KR)

(72) Inventor: Jae Whoan Park, Cheonan-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 282 days.

(21) Appl. No.: 17/881,374

(22) Filed: Aug. 4, 2022

(65) Prior Publication Data
US 2023/0044666 A1 Feb. 9, 2023

(30) Foreign Application Priority Data

Aug. 6, 2021 (KR) .......................... 10-2021-0104149

(51) Int. Cl.
*B60R 7/06* (2006.01)
*E05D 15/58* (2006.01)
*E05F 5/08* (2006.01)

(52) U.S. Cl.
CPC .......... *B60R 7/06* (2013.01); *E05D 2015/585* (2013.01); *E05D 2015/586* (2013.01); *E05F 5/08* (2013.01); *E05Y 2201/212* (2013.01); *E05Y 2900/538* (2013.01)

(58) Field of Classification Search
CPC .... B60R 7/06; B60R 2011/0005; E05D 3/145
USPC .................................................... 296/37.12
See application file for complete search history.

(56) References Cited

U.S. PATENT DOCUMENTS

| 5,951,083 A | * | 9/1999 | Bittinger | .................. B60N 3/12 16/339 |
| 7,494,170 B2 | * | 2/2009 | Hanzel | .................... B60R 11/00 296/37.8 |
| 7,578,406 B2 | * | 8/2009 | Katagiri | .................... B60R 7/06 224/539 |

(Continued)

FOREIGN PATENT DOCUMENTS

| GB | 2522837 A | * | 8/2015 | ............. B60N 3/002 |
| JP | 09-086290 A | | 3/1997 | |

(Continued)

OTHER PUBLICATIONS

Office Action issued in corresponding KR application 10-2021-0104149 dated Jan. 25, 2023 with English translation.

*Primary Examiner* — Jason S Morrow
(74) *Attorney, Agent, or Firm* — Morgan, Lewis & Bockius LLP

(57) ABSTRACT

A glove box includes a cover embedded in a dashboard of a vehicle in a state in which a front of the cover is open, a housing having one open surface covered by the cover and selectively opening or closing the front of the cover through a preset rotational trajectory, transfer links each arranged between one of outer ends of the housing and a corresponding one of inner ends of the cover and providing a rotational trajectory of the housing, and an elastic member that corrects rotational forces of the transfer links. The transfer links includes first and second link parts each having a first end rotatably connected to an inner lower portion of the cover and a second end rotatably connected to an outer upper portion of the housing, and being spaced apart from each other with the same length and the same mounting angle.

10 Claims, 26 Drawing Sheets

(56) References Cited

U.S. PATENT DOCUMENTS

| | | | | |
|---|---|---|---|---|
| 7,703,623 B2* | 4/2010 | Katagiri | | B60R 7/06 220/264 |
| 9,937,866 B2* | 4/2018 | Jeon | | B60R 7/06 |
| 10,066,431 B2* | 9/2018 | Roychoudhury | | E05F 3/00 |
| 10,442,362 B2* | 10/2019 | Oldani | | B60R 7/06 |
| 11,518,314 B2* | 12/2022 | Park | | B60R 7/06 |
| 11,623,575 B2* | 4/2023 | Park | | E05B 83/30 296/37.12 |
| 11,713,000 B2* | 8/2023 | Park | | B60R 7/06 296/37.8 |
| 2008/0121501 A1* | 5/2008 | Ahn | | H01H 3/161 200/61.81 |
| 2009/0295183 A1* | 12/2009 | Piekny | | B60R 7/06 224/539 |
| 2022/0089095 A1* | 3/2022 | Park | | B60R 7/06 |
| 2023/0038548 A1* | 2/2023 | Park | | B60R 7/06 |
| 2023/0039871 A1* | 2/2023 | Park | | B60R 7/06 |
| 2023/0042147 A1* | 2/2023 | Park | | E05D 3/125 |
| 2023/0044080 A1* | 2/2023 | Park | | B60R 7/06 |
| 2023/0044666 A1* | 2/2023 | Park | | B60R 7/06 |
| 2023/0279709 A1* | 9/2023 | Moon | | F16F 9/3235 296/37.12 |
| 2023/0304341 A1* | 9/2023 | Moon | | E05F 5/02 |
| 2023/0311778 A1* | 10/2023 | Moon | | B60R 7/06 296/37.12 |
| 2024/0067097 A1* | 2/2024 | Shin | | B60R 7/06 |
| 2024/0083364 A1* | 3/2024 | Nishimura | | B60R 7/06 |

FOREIGN PATENT DOCUMENTS

| | | | |
|---|---|---|---|
| JP | 6154353 B2 | 6/2017 | |
| KR | 20-1996-0004721 U | 2/1996 | |
| KR | 1998-054092 U | 10/1998 | |

\* cited by examiner

GLOVE BOX

CROSS-REFERENCE TO RELATED APPLICATION

This application claims priority to and the benefit of Korean Patent Application No. 10-2021-0104149 filed on Aug. 6, 2021, the disclosure of which is incorporated herein by reference in its entirety.

BACKGROUND

1. Technical Field

The present disclosure relates to a glove box.

2. Discussion of Related Art

In general, glove boxes of vehicles are installed to be opened or closed on dashboards located in front of a seat of a driver and a seat of a passenger and provide storage spaces in which simple objects may be stored to promote the convenience of occupants (drivers, passengers, users, and the like).

Such glove boxes are generally classified into a rotation type having a hinge shaft, a sliding type, and a lid type.

In a glove box having a rotation type according to the related art, as the depth of a housing increases, a rear upper edge of the housing may collide with an inner upper surface of the dashboard, and thus there is no choice but to generate an inner unused and misused space.

In a glove box having a sliding type according to the related art, since all the inner unused and misused space may be used but the glove box may be caught on a knee of an occupant due to a structure whenever the housing is extracted, an extraction amount should be limited.

In a glove box having a lid type according to the related art, since the glove box is opened or closed in a state in which the housing itself is fixed, it may be inconvenient to insert or remove items into or from the housing.

As a result, since the glove boxes having various types according to the related art each have some disadvantages according to the type, a new type of structure that may compensate for the existing disadvantages is being sought.

SUMMARY

The present disclosure is directed to providing a glove box capable of having a maximized storage space and improving convenience of use through various operating mechanisms.

The aspects of the present disclosure are not limited to the aspects described above, and those skilled in the art will clearly understand other aspects not described herein from the following description.

A glove box includes a cover that has a space in a dashboard of a vehicle in a state in which a front side of the cover is open, a housing that is located in the space of the cover in a state in which one open surface of the housing is covered, has a storage space therein, and selectively opens or closes the open front side of the cover through a preset transfer trajectory, and a plurality of transfer links each arranged between one of two outer ends of the housing and a corresponding one of two inner ends of the cover to provide a transfer trajectory of the housing.

The transfer links may include a first link part and a second link part that have first ends rotatably connected to an inner lower part of the cover and second ends rotatably connected to an outer upper part of the housing and that have different mounting angles.

The first link part and the second link part may be spaced apart from each other, and rotation support points of the first link part and the second link part may be in parallel at the same level.

The first link part and the second link part may be spaced apart from each other, and the second end of the first link part and the second end of the second link part are rotatable at different levels.

The second end of the second link part may be located at a relatively lower level than the second end of the first link part.

The second end of the second link part may be located at a relatively higher level than the second end of the first link part.

The first link part may include a first connecting bar, a first hinge shaft that connects a first end of the first connecting bar to the inner lower part of the cover, and a first movable shaft that connects a second end of the first connecting bar to the outer upper part of the housing.

The second link part may include a second connecting bar that is rotatable at a different angle from the first connecting bar, a second hinge shaft that is disposed to be parallel to the first hinge shaft at a same level, is spaced apart from the first hinge shaft, and connects a first end of the second connecting bar to the inner lower part of the cover, and a second movable shaft that connects as second end of the second connecting bar to the outer upper part of the housing.

A central part extending rearward may be disposed between the first and second ends of the second connecting bar in a lengthwise direction.

A guide protrusion protruding laterally to be slidably coupled to an arch-shaped guide hole included in a side wall of the cover may be disposed in the central part.

The housing may be transferred along an arch-shaped guide hole included in a side wall of the cover and may open or close the front surface of the cover.

A rotation angle at which the housing is opened may be set according to angles and position at which the second ends of the first and second link parts are mounted on the cover.

A glove box according to another embodiment of the present disclosure includes a cover that is built in a dashboard of a vehicle in a state in which a front side of the cover is open, a housing that is accommodated in a state in which one open surface of the housing is covered by the cover and selectively opens or closes the front side of the cover through a preset rotational trajectory, a plurality of transfer links each arranged between one of two outer ends of the housing and a corresponding one of two inner ends of the cover and configured to provide a rotational trajectory of the housing, and an elastic member that corrects rotation of the transfer link.

The elastic member may have a first end coupled to the transfer links and a second end coupled to the cover.

The glove box may further include a locking member that is disposed between and connected to the cover and the housing to selectively lock the housing from the cover.

The elastic member may be a torsion spring.

The transfer links may include a first link part and a second link part having first ends rotatably connected to an inner lower part of the cover and second ends rotatably connected to an outer upper part of the housing.

The first and second link parts may be mounted at different angles.

The first link part may include a first connecting bar, a first housing shaft that connects a first end of the first connecting bar to the inner lower part of the cover, a first movable shaft that connects a second end of the first connecting rod to an outer upper part of the housing, and a link fixing protrusion that protrudes in a lengthwise direction of the first connecting bar and connects the first connecting bar to the first end of the elastic member.

The second link part may include a second connecting bar that is mounted and rotated at an angle different from that of the first connecting bar, a second hinge shaft that is disposed to be parallel to the first hinge shaft at a same level, is spaced apart from the first hinge shaft, and connects a first end of the second connecting bar to the inner lower part of the cover, and a second movable shaft that connects a second end of the second connecting bar to the outer upper part of the housing.

A central part extending rearward may be disposed between two ends of the second connecting bar in a lengthwise direction, and a guide protrusion protruding laterally to be slidably coupled to an arch-shaped guide hole included in a side wall of the cover may be disposed in the central part.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
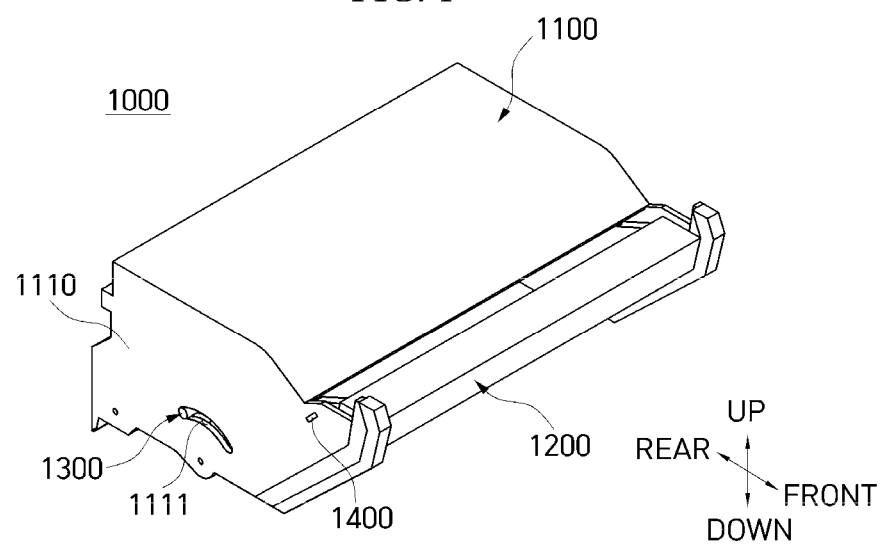
FIG. 1 is a perspective view illustrating a glove box according to a first embodiment of the present disclosure.
Figure 2:
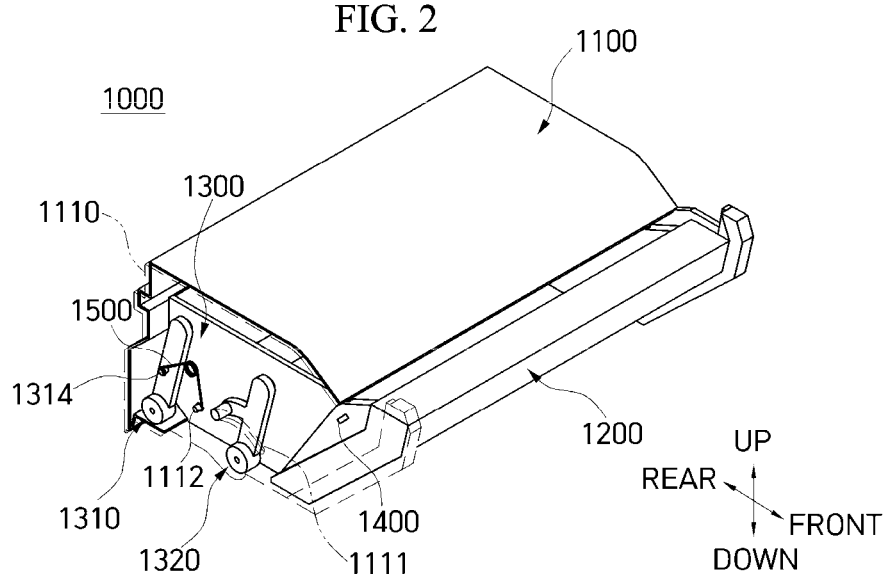
FIG. 2 is a schematic perspective view illustrating a configuration of a side surface of the glove box of FIG. 1.

Advantages and features of the present disclosure and a method of achieving the advantages and the features will become apparent with reference to embodiments described below in detail together with the accompanying drawings. However, the present disclosure is not limited to the embodiments described below but will be implemented in various forms, and the present embodiments merely make the disclosure of the present disclosure complete, are provided to completely inform those skilled in the art to which the present disclosure belongs of the scope of the present disclosure, and are defined by the description of the appended claims. Meanwhile, terms used in the present specification are intended to describe the embodiments and are not intended to limit the present disclosure. In the present specification, a singular form also includes a plural form unless specifically mentioned in a phrase. The term "comprise" or "comprising" used herein does not exclude the presence or addition of one or more other components, steps, operations, and/or elements in addition to components, steps, operations, and/or elements mentioned above. In the present specification, the term "and/or" includes any one or all possible combinations of listed items.

Hereinafter, exemplary embodiments of the present disclosure will be described in detail with reference to the accompanying drawings.

First Embodiment

FIGS. 1 to 5 illustrate a glove box according to a first embodiment of the present disclosure.

Referring to FIGS. 1 to 5, a glove box 1000 may be accommodated inside a dashboard facing a passenger seat.

The glove box 1000 includes a cover 1100, a housing 1200, transfer links 1300, a locking member 1400, and an elastic member 1500.

The cover 1100 has an empty space in a dashboard of a vehicle in a state in which a front surface thereof is open. That is, an upper surface, two side surfaces, and a rear surface of the cover 1100 are sealed. In this case, two sides of the cover 1100 are provided with side walls 1110 forming wall surfaces. An arch-shaped guide hole 1111 is formed in the side wall 1110.

The housing 1200 is located in the empty space of the cover 1100 in a state in which one open surface thereof is covered and has a storage space therein. The housing 1200 selectively opens or closes the open front surface of the cover 1100 through a preset transfer trajectory. Here, the preset transfer trajectory is a transfer path in which the housing 1200 rotates in the guide hole 1111 formed in the side wall 1110 of the cover 1100.

The transfer links 1300 are arranged between two outer ends of the housing 1200 and two inner ends of the cover 1100 and provide the transfer trajectory of the housing 1200.

The transfer links 1300 are arranged at two ends of the housing 1200.

The transfer link 1300 includes a first link part 1310 and a second link part 1320.

One ends (support points) of the first link part 1310 and the second link part 1320 are rotatably connected to an inner lower part of the cover 1100. The other ends of the first link part 1310 and the second link part 1320 are rotatably connected to an outer upper part of the housing 1200.

The first link part 1310 and the second link part 1320 are spaced apart from each other, and the one end of the first link part 1310 and the one end of the second link part 1320 have a structure in which the one ends may rotate in parallel at the same level. The other end of the first link part 1310 and the other end of the second link part 1320 have different angles even though the lengths of first and second connecting bars 1311 and 1321, which will be described below, are the same and thus have a structure in which the other ends may rotate not in parallel to each other.

Here, the first link part 1310 and the second link part 1320 have different mounting angles, and thus an open rotation angle of the housing 1200 may be adjusted. Thus, an object may be easily stored and extracted.

Further, the support points of the first link part 1310 and the second link part 1320 are disposed at a lower end of the cover 1100, the locking member 1400 is disposed at an upper end of the cover 1100, and thus the stability of the housing 1200 in a locked state is improved.

The first link part 1310 includes the first connecting bar 1311, a first hinge shaft 1312, a first movable shaft 1313, and a link fixing protrusion 1314.

The first connecting bar 1311 is formed in a linear bar shape.

The first hinge shaft 1312 connects one end of the first connecting bar 1311 and an inner lower part of the cover 1100.

The first movable shaft 1313 connects the other end of the first connecting bar 1311 and an outer upper part of the housing 1200.

The second link part 1320 includes the second connecting bar 1321, a second hinge shaft 1322, a second movable shaft 1323, and a guide protrusion 1324.

The second connecting bar 1321 is mounted and rotated at a different angle from the first connecting bar 1311. For example, the mounting angle α of the first connecting bar 1311 and the mounting angle β of the second connecting bar 1321 are different, and the linear length L1 of the first connecting bar 1311 and the linear length L2 of the second connecting bar 1321 may be the same or different.

The transfer link 1300 under this condition may utilize a rear unused and misused space as an effective space, effectively control an open rotation angle γ of the housing 1200, and thus maximize the convenience of storage and/or extraction of an object.

The second connecting bar 1321 has a central part extending rearward between two ends thereof in a lengthwise direction. The guide protrusion 1324 protrudes from such a central part. The guide protrusion 1324 may be slidably coupled to the guide hole 1111 formed in the side wall 1110 of the cover 1100.

The second hinge shaft 1322 is disposed to be parallel to the first hinge shaft 1312 at the same level and spaced apart from the first hinge shaft 1312. The second hinge shaft 1322 connects one end of the second connecting bar 1321 and the inner lower part of the cover 1100.

The second movable shaft 1323 connects the other end of the second connecting bar 1321 and the outer upper part of the housing 1200.

The locking member 1400 is connected between the cover 1100 and the housing 1200 to serve to selectively lock or unlock the housing 1200 to or from the cover 1100.

The elastic member 1500 has a structure for correcting a rotational force of the transfer link 1300.

For example, the elastic member 1500 may be formed as a torsion spring and have a structure in which one end thereof is coupled to the transfer link 1300 and the other end thereof is coupled to the cover 1100.

The one end of the elastic member 1500 is coupled to a cover fixing protrusion 1112 protruding from the inside of the side wall 1110 of the cover 1100. That is, the cover fixing protrusion 1112 protrudes from one surface of the cover 1100 in a direction in which the transfer link 1300 is disposed.

The other end of the elastic member 1500 is coupled to the link fixing protrusion 1314 protruding from the central part of the first connecting bar 1311. Here, the link fixing protrusion 1314 protrudes from one surface of the first connecting bar 1311 in a direction in which the cover 1100 is disposed.

When the housing 1200 in an open state is rotated to a closed state, the elastic member 1500 may allow an occupant to easily rotate the housing 1200 with a small force using an elastic force.

When the link fixing protrusion 1314 is located above a virtual line 1510 connecting the first hinge shaft 1312 and the cover fixing protrusion 1112, an elastic force pushing the one end and the other end of the elastic member 1500 away from each other is generated while the housing 1200 is closed.

In contrast, when the link fixing protrusion 1314 is located below the virtual line 1510 connecting the first hinge shaft 1312 and the cover fixing protrusion 1112, an elastic force pulling the one end and the other end of the elastic member 1500 toward each other is generated while the housing 1200 is opened.

Thus, the elastic member 1500 may allow the occupant to easily open or close the housing 1200 from the cover 1100.

The distance between the link fixing protrusion 1314 and the virtual line 1510 is relatively smaller when the housing 1200 is opened than when the housing 1200 is closed.

For example, when the occupant closes the housing 1200 which is in an open state, the housing 1200 is lifted up by a short distance between the link fixing protrusion 1314 and the virtual line 1510. Thus, the link fixing protrusion 1314 is moved to an upper part of the virtual line 1510, and the housing 1200 semi-automatically closes the cover 1100 due to the elastic force of the elastic member 1500.

In contrast, when the occupant opens the housing 1200 which is in a closed state, the link fixing protrusion 1314 is moved to a lower part of the virtual line 1510, and the housing 1200 safely opens the cover 1100 because the rotational force is attenuated by the elastic member 1500.

Figure 3:
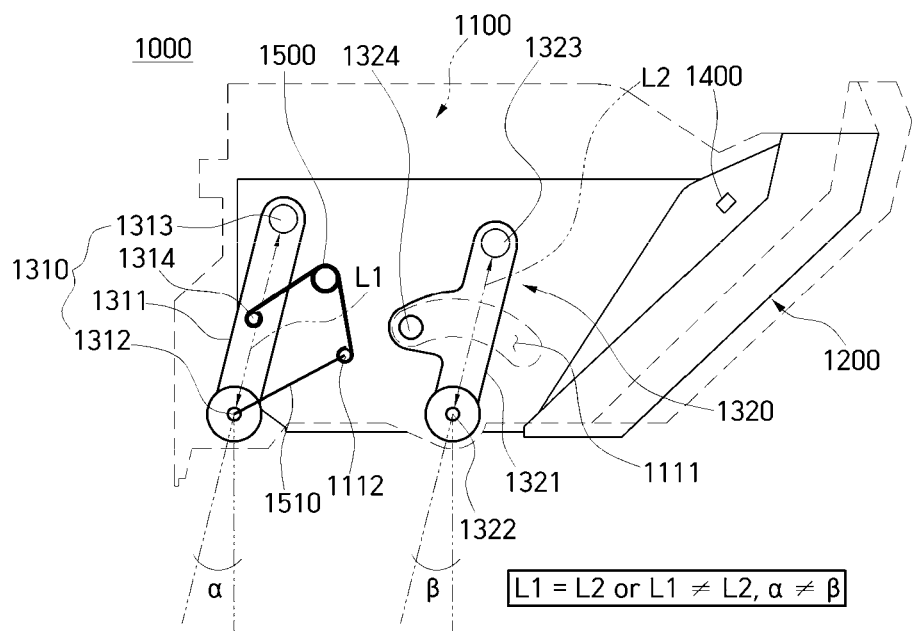
FIGS. 3 to 5 are schematic operational diagrams illustrating an opening/closing structure of the glove box according to the first embodiment of the present disclosure.
Figure 4:
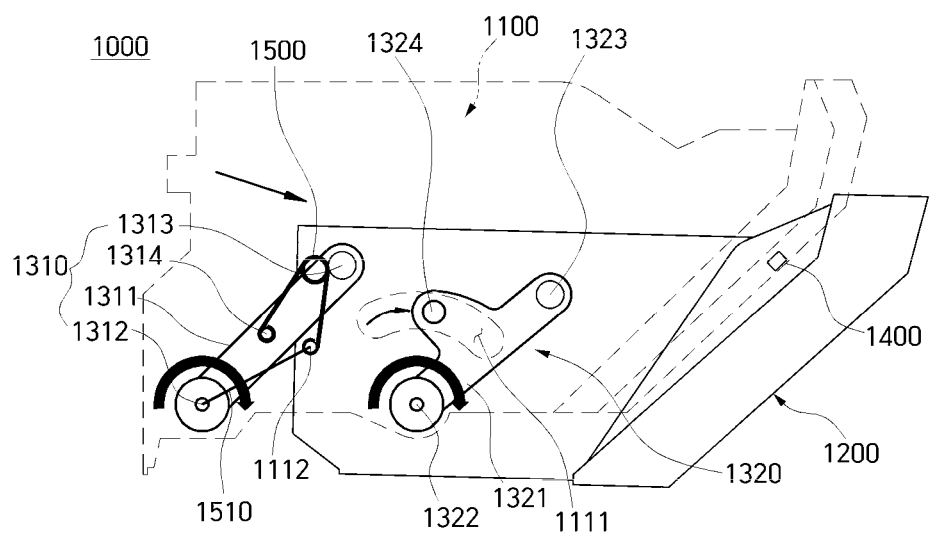
Figure 5:
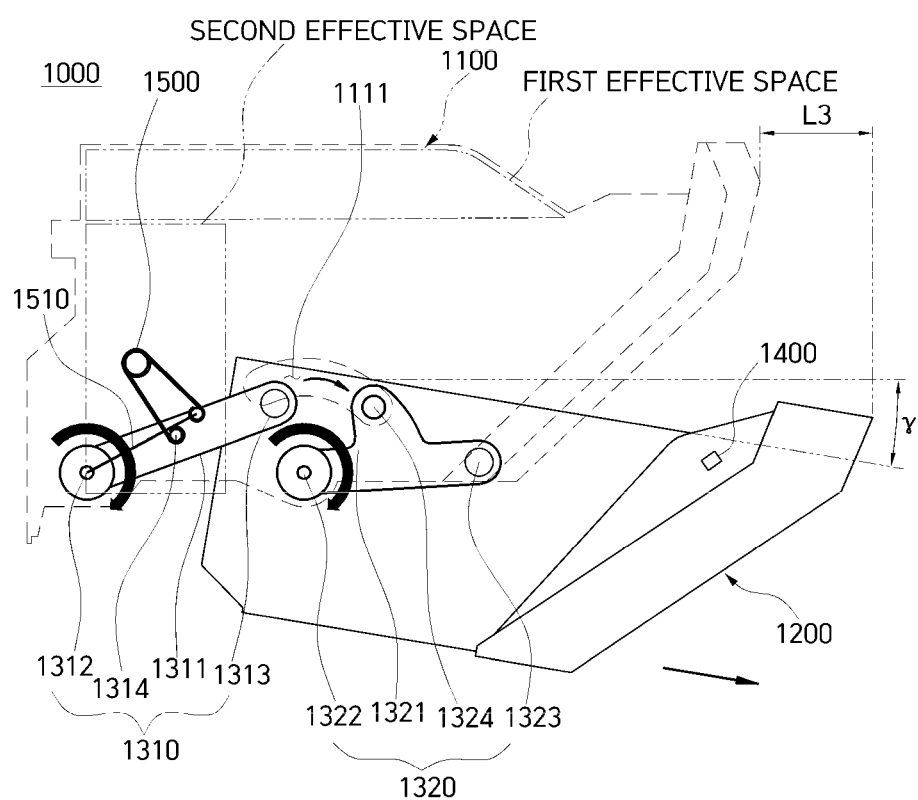
Figure 6:
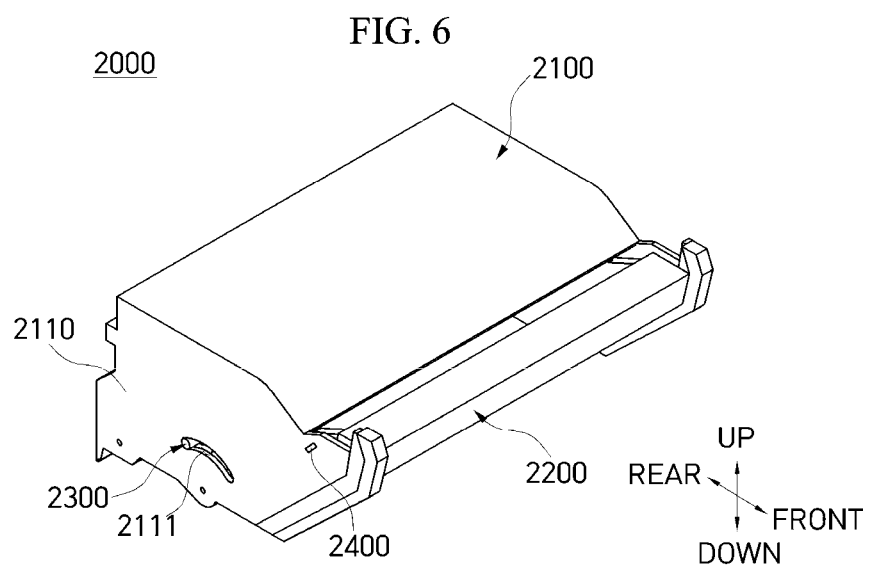
FIG. 6 is a perspective view illustrating a glove box according to a second embodiment of the present disclosure.
Figure 7:
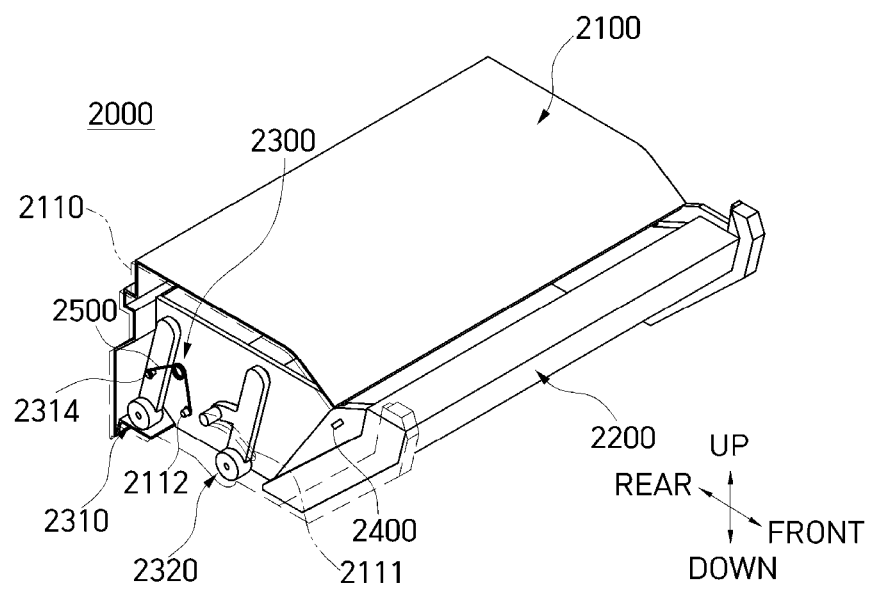
FIG. 7 is a schematic perspective view illustrating a configuration of a side surface of the glove box of FIG. 6.

Meanwhile, as illustrated in FIGS. 3 to 5, in the description of an operation mechanism of the glove box 1000, the glove box 1000 has a structure in which the housing 1200 moves linearly and rotationally to open or close the cover 1100.

The housing 1200 has a trajectory in which the housing 1200 is rotated and transferred along the guide hole 1111 with respect to the first hinge shaft 1312 and the second hinge shaft 1322 of the transfer link 1300.

In this case, the first and second movable shafts 1313 and 1323 are rotatably connected to two ends of the housing 1200.

When the mounting angle α of the first connecting bar 1311 and the mounting angle β of the second connecting bar 1321 are different, and the linear length L1 of the first connecting bar 1311 and the linear length L2 of the second connecting bar 1321 are the same or different, the glove box 1000 may effectively control the open rotation angle γ of the housing 1200 to maximize the convenience of storage and/or extraction of an object.

That is, since the open rotation angle γ of the housing 1200 changes according to the mounting angles α and β and the linear lengths L1 and L2 of the first and second connecting bars 1311 and 1321, when the corresponding conditions are applied differently according to each situation, the desired open rotation angle γ can be controlled.

According to this change of the conditions, the glove box 1000 may adjust a protrusion length L3 of the housing 1200. For example, when the mounting angle β of the second connecting bar 1321 is greater than the mounting angle α of the first connecting bar 1311, the open rotation angle γ of the housing 1200 may increase.

As the mounting angles α and β of the first and second connecting bars 1311 and 1321 increase regardless of a relative angular size, the open rotation angle γ of the housing 120 increases.

Thus, when the mounting angles α and β of the first and second connecting bars 1311 and 1321 increase, a knee of the occupant may be prevented from getting caught in a seated state, and at the same time, a storage entry range may be widened. However, when the storage space is physically tilted downward and when the housing 1200 is opened, items stored in the housing 1200 may spill out at once, and thus separate actions should be performed. A second embodiment, which is one of the actions, will be described.

Second Embodiment

FIGS. 6 to 10 illustrate a glove box according to a second embodiment of the present disclosure.

Referring to FIGS. 6 to 10, a glove box 2000 in the second embodiment has an operation mechanism under a condition that is different from that of the glove box 1000.

In particular, the glove box 2000 in the second embodiment has a horizontal-angle open structure in which a housing 2200 converges to 0 degrees without downward rotation.

In the corresponding embodiment, the duplicated configurations with the glove box 1000 will be omitted, and differences will be mainly described. However, duplicated configurations may be described for convenience of description.

A first connecting bar 2311 and a second connecting bar 2321 are mounted and rotated at the same length and the same angle.

For example, when the mounting angle α' of the first connecting bar 2311 and the mounting angle β' of the second connecting bar 2321 are the same and when the linear length L1' of the first connecting bar 2311 and the linear length L2' of the second connecting bar 2321 are the same, the glove box 2000 has a structure in which a rear unused and misused space may be utilized as an effective space, and the housing 2200 is opened by descending forward (toward the occupant) at a horizontal angle without vertical rotation.

Here, the glove box 2000 has a structure in which, since the housing 2200 horizontally protrudes by a predetermined length L4 without rotation, when the occupant opens the housing 2200 when extracting items from the storage space, the items are prevented from being spilled downward.

The housing 2200 improves support stability through a support point of a transfer link 2300 arranged at a lower end of a cover 2100 and a locking member 2400 arranged at an upper end between the locking member 2400 and the cover 2100.

Figure 8:
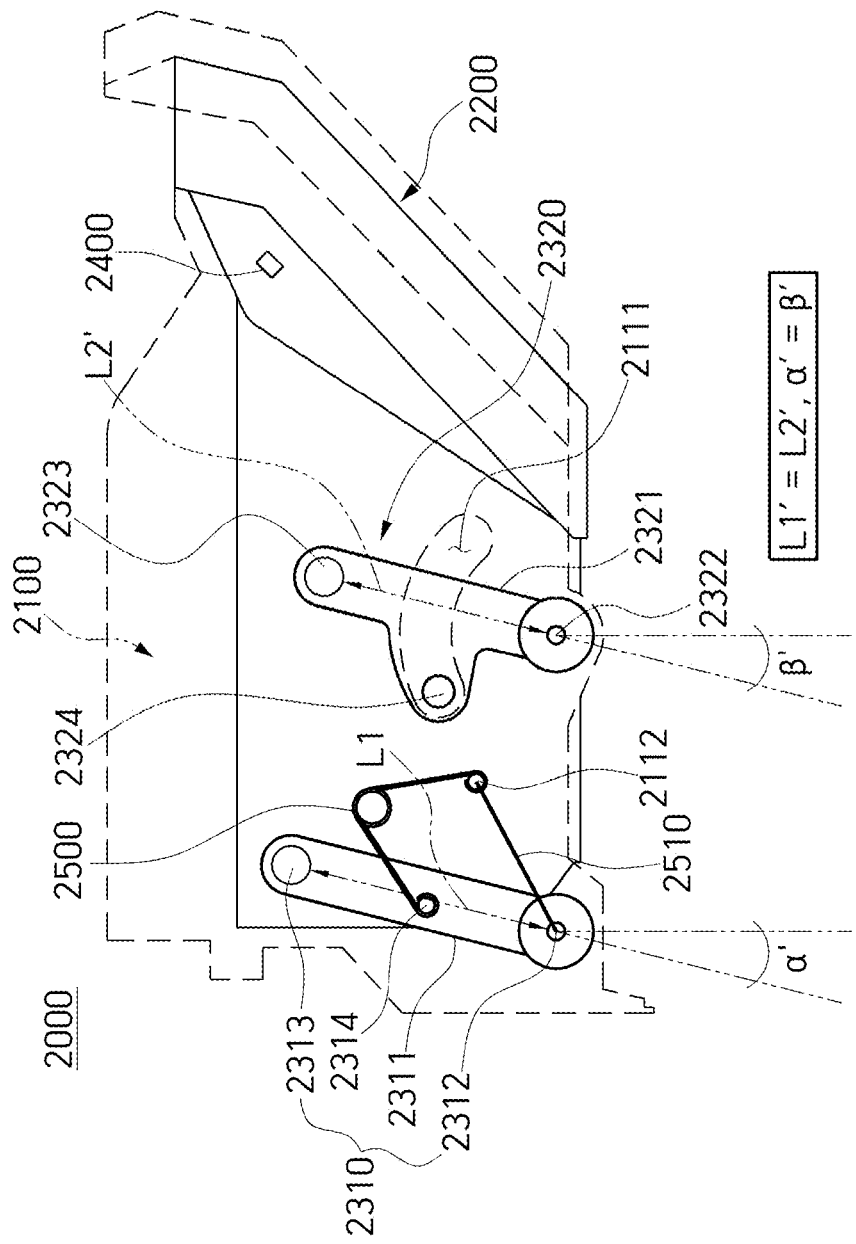
FIGS. 8 to 10 are schematic operational diagrams illustrating an opening/closing structure of the glove box according to the second embodiment of the present disclosure.
Figure 9:
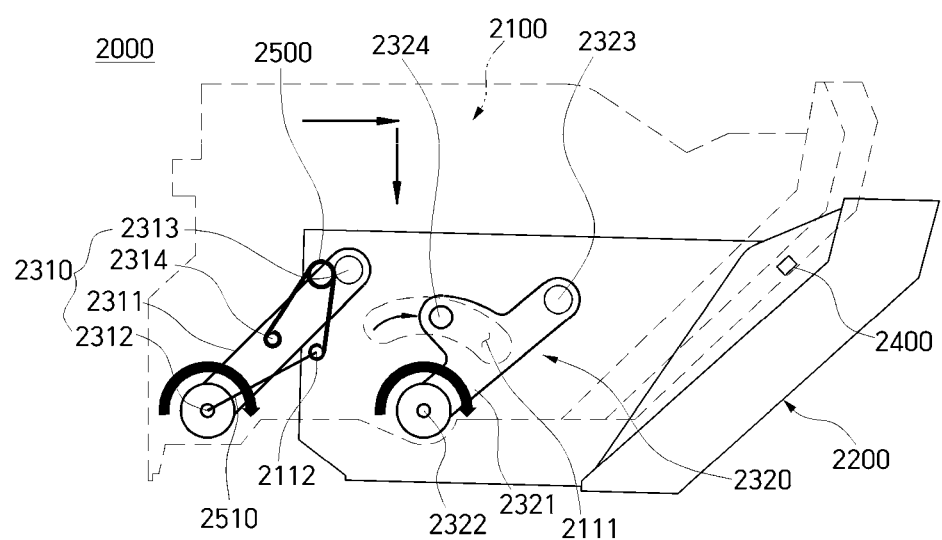
Figure 10:
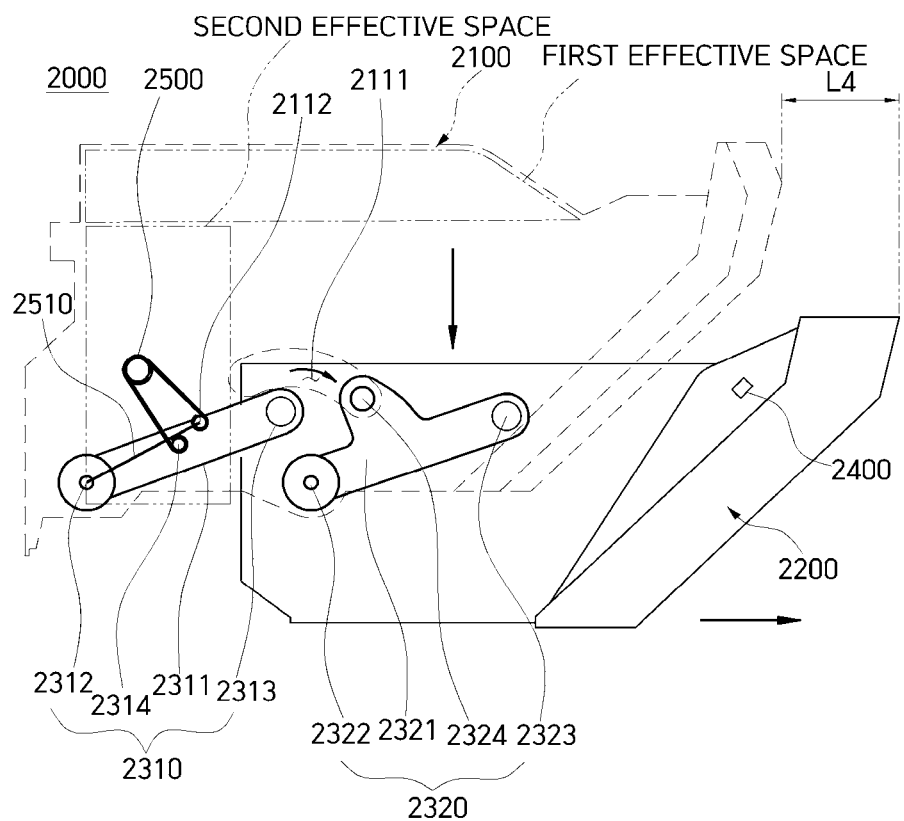
Figure 11:
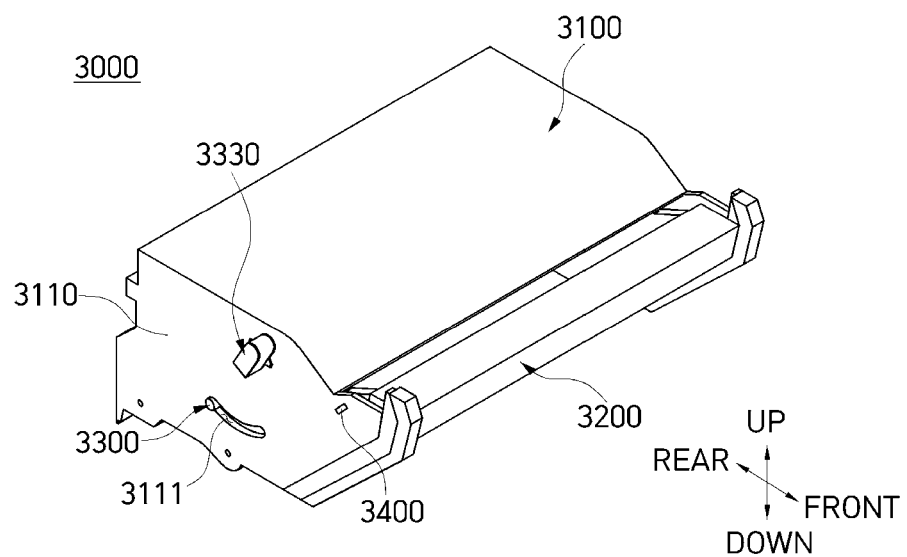
FIG. 11 is a perspective view illustrating a glove box according to a third embodiment of the present disclosure.

Meanwhile, as illustrated in FIGS. 8 to 10, in the description of the operation mechanism of the glove box 2000, in the glove box 2000, since the first and second connecting bars 2311 and 2321 of first and second link parts 2310 and 2320 have the same mounting angle and the same length, the storage space of the housing 2200 may be opened or closed in a horizontal direction.

The housing 2200 has a trajectory in which the housing 2200 is rotated and transferred along a guide hole 2111 with respect to a first hinge shaft 2312 and a second hinge shaft 2322 of the transfer link 2300.

First and second movable shafts 2313 and 2323 are rotatably connected to two ends of the housing 2200 and are located at the same height, and thus one end of the housing 2200 is not tilted downward even through rotation.

That is, when rotating in the guide hole 2111, the housing 2200 is lowered forward from an initial position to an open position but is not tilted downward and maintains a horizontal state. In other words, the glove box 2000 has a structural mechanism in which the housing 2200 is open in the horizontal direction, and thus downward tilting of the storage space is prevented.

For this condition, the mounting angle α' of the first connecting bar 2311 and the mounting angle β' of the second connecting bar 2321 are the same, and the linear length L1' of the first connecting bar 2311 and the linear length L2' of the second connecting bar 2321 may be the same.

In this case, the glove box 2000 may have a structure in which the storage space is effectively open without open rotation of the housing 2200, thereby maximizing the convenience of the storage and/or extraction of objects.

As a result, since the first connecting bar 2311 and the second connecting bar 2321 mounted between the housing 2200 and the cover 2100 have the same angle and the same length, the housing 2200 may be opened horizontally/vertically without downward rotation when opened.

Thus, the glove box 2000 minimizes the protrusion length L4 of the housing 2200 to prevent the knee of the occupant from being caught in a seated state.

Third Embodiment

FIGS. 11 to 16 illustrate a glove box according to a third embodiment of the present disclosure.

Referring to FIGS. 11 to 16, in a glove box 3000 according to the third embodiment, in order to maximize the opening of a housing 3200, a first connecting bar 3311 and a second connecting bar 3321 of a transfer link 3300 have a relatively long linear bar shape.

In detail, an upper surface, two side surfaces, and a rear surface of a cover 3100 are sealed. In this case, two sides of the cover 3100 are provided with side walls 3110 forming wall surfaces. An arch-shaped guide hole 3111 is formed in the side wall 3110.

The transfer links 3300 are arranged between two outer ends of the housing 3200 and two inner ends of the cover 3100 and provide a transfer trajectory of the housing 3200. The transfer links 3300 are arranged at two ends of the housing 3200.

The transfer link 3300 includes a first link part 3310 and a second link part 3320.

One ends of the first link part 3310 and the second link part 3320 are rotatably connected to an inner upper part of the cover 3100.

The other ends of the first link part 3310 and the second link part 3320 are rotatably connected to an outer upper part of the housing 3200.

The first link part 3310 and the second link part 3320 are located apart from each other.

The one end of the first link part 3310 and the one end of the second link part 3320 have a structure in which the one ends may rotate in parallel at the same level.

In this case, the first link part 3310 and the second link part 3320 have different mounting angles, and thus an open rotation angle of the housing 3200 may be adjusted. Thus, an object may be easily stored and extracted.

Further, support points of the first link part 3310 and second link part 3320 are arranged at an upper end of the cover 3100, and the locking member 3400 is disposed in a horizontal position.

The first link part 3310 includes the first connecting bar 3311, a first hinge shaft 3312, a first movable shaft 3313, and a guide protrusion 3314.

The first connecting bar 3311 is formed in a linear bar shape.

The first hinge shaft 3312 connects one end of the first connecting bar 3311 and an inner upper part of the cover 3100.

The first movable shaft 3313 connects the other end of the first connecting bar 3311 and an outer lower part of the housing 3200.

A guide protrusion 3324 is formed in a central part of the first connecting bar 3311.

Here, the guide protrusion 3324 is connected to the first connecting bar 3311, which is different from the above-described embodiments. The guide protrusion 3324 is exposed while connected to the guide hole 3111 and assists with the rotation of the first connecting bar 3311.

The second link part 3320 includes the second connecting bar 3321, a second hinge shaft 3322, and a second movable shaft 3323.

The second connecting bar 3321 has one end connected to an upper support point of the cover 3100 by the second hinge shaft 3322.

A lower end of the second connecting bar 3321 is rotatably connected to a side surface of a lower end of the housing 3200 through the second movable shaft 3323.

The mounting angle of the first connecting bar 3311 and the mounting angle of the second connecting bar 3321 are different, and the linear length of the first connecting bar 3311 and the linear length of the second connecting bar 3321 are different.

Basically, since the mounting angles of the first connecting bar 3311 and the second connecting bar 3321 are in a range of an acute angle exceeding about 45 degrees, and the linear lengths thereof are greater than those in the above-described embodiments, the open rotation angle of the housing 3200 may be greater than those in the above-described embodiment.

Further, the first and second connecting bars 3311 and 3321 are different from the above-described embodiments in that support points thereof are located not at a lower end of a side surface but at an upper end of the side surface of the cover 3100 and the housing 3200 is transferred within the range of the guide hole 3111.

That is, as the guide protrusion 3314 of the first connecting bar 3311 moves from a starting point of the guide hole 3111 in a state in which the housing 3200 is closed to an end point of the guide hole 3111 in a state in which the housing 3200 is open, the mounting angles of the first and second connecting bars 3311 and 3321 may change.

For example, when the first and second connecting bars 3311 and 3321 maintain a flat mounting angle up to a certain point and then reach the end point of the guide hole 3111 on the guide protrusion 3314, the mounting angles of the first and second connecting bars 3311 and 3321 may be changed to different mounting angles while the open rotation angle of the housing 3200 sharply increases.

Even under this condition, the glove box 3000 may effectively control the open rotation angle of the housing 3200 to maximize the convenience of the storage and/or extraction of objects.

The second hinge shaft 3322 is disposed to be parallel to the first hinge shaft 3312 at the same time while spaced apart from the first hinge shaft 3312 and connects the one end of the second connecting bar 3321 and the inner upper part of the cover 3100.

The second movable shaft 3323 connects the other end of the second connecting bar 3321 and the outer lower part of the housing 3200 while spaced apart from the first movable shaft 3313.

The glove box 3000 may additionally include an opening/closing auxiliary part 3330 that guides rotation of the first link part 3310.

The opening/closing auxiliary part 3330 corrects a rotational force of the transfer link 3300 to help to smoothly open or close the housing 3200.

For example, the opening/closing auxiliary part 3330 attenuates an opening rotational force of the housing 3200 and amplifies a closing rotational force of the housing 3200.

That is, while the housing 3200 is opened, the opening speed rapidly increases in a downward direction, and items in the storage space may spill out. Thus, the opening/closing auxiliary part 3330 attenuates the opening rotational force of the housing 3200.

Thus, the opening/closing auxiliary part 3330 prevents the items in the storage space of the housing 3200 from being spilled downward.

Further, while the housing 3200 is closed, the opening/closing auxiliary part 3330 helps the rotational force of the transfer link 3300 so that the housing 3200 smoothly moves to an initial position.

To this end, the opening/closing auxiliary part 3330 includes a case 3331, a cam 3332, a support rod 3333, and a spring 3334.

The case 3331 has an accommodation space therein and is located on the side wall 3110 of the cover 3100 and inclined toward the center of the guide hole 3111.

Further, the case 3331 is provided with a connection bracket 3331*a* protruding from the outer surface thereof and fixed to the side wall 3110 of the cover 3100 through bolting.

The cam 3332 is located in a rotatable form in the accommodation space of the case 3331. A cam protrusion 3332*a* protrudes from the outer surface of the cam 3332. Here, the cam protrusion 3332*a* has an inverted triangular shape and has a chamfering structure having a gentle apex.

The cam 3332 is basically formed in a circular shape. A cam hole 3332*b* is formed at a center point of the cam 3332. The first hinge shaft 3312 connected to a first shaft hole 3312*a* of the first connecting bar 3311 may be fastened to the cam hole 3332*b*.

Accordingly, the cam 3332 may rotate in the same direction and at the same speed as the first hinge shaft 3312 in conjunction with the rotation of the first hinge shaft 3312.

The support rod 3333 vertically reciprocates inside the case 3331 according to the rotation of the cam 3332 while in contact with the cam protrusion 3332a.

The support rod 3333 may have one end in contact with an upper inner surface of the case 3331 and the other end located between a lower bottom surface of the case 3331 and the support rod 3333.

The support rod 3333 has an inclined surface 3333a and a spring hole 3333b.

The inclined surface 3333a is inclined in one direction from an upper surface of the support rod 3333.

The inclined surface 3333a comes into contact with the cam protrusion 3332a according to the rotation of the cam 3332 disposed thereon, thereby guiding the movement of the support rod 3333 so that the support rod 3333 moves inside the case 3331 in a sliding manner.

Figure 12:
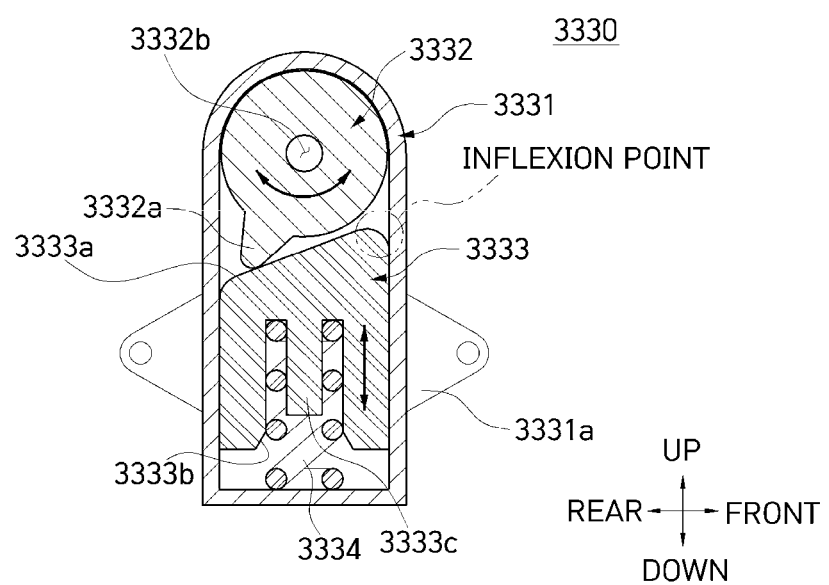
FIG. 12 is a cross-sectional view illustrating an opening/closing auxiliary part in the glove box according to the third embodiment of the present disclosure.
Figure 13:
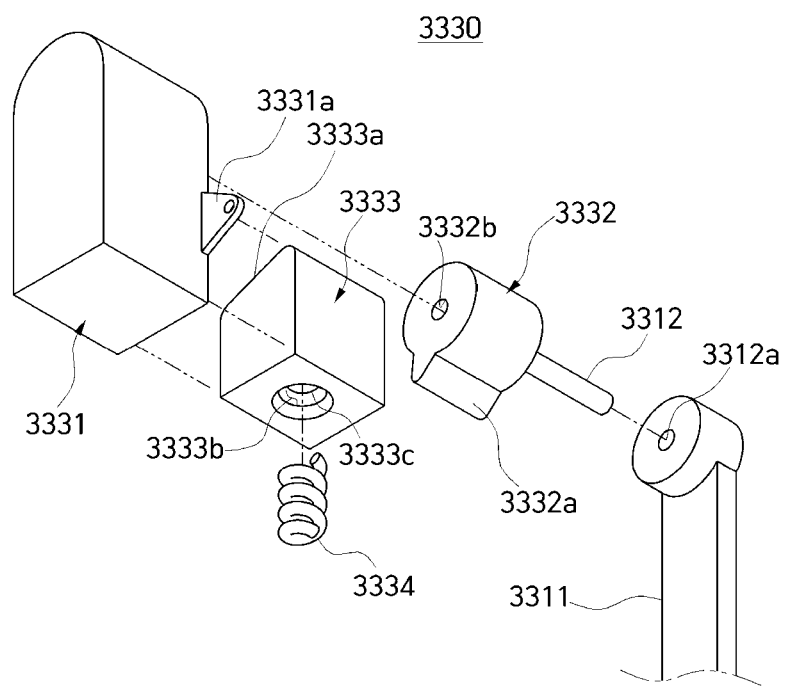
FIG. 13 is an exploded perspective view illustrating the opening/closing auxiliary part in the glove box according to the third embodiment of the present disclosure.
Figure 14:
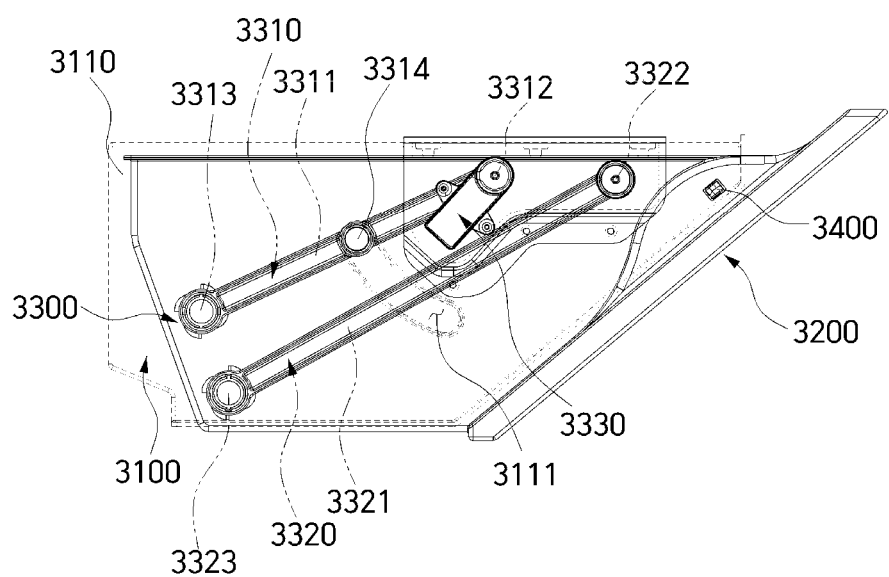
FIGS. 14 to 16 are schematic operational diagrams illustrating an opening/closing structure of the glove box according to the third embodiment of the present disclosure.
Figure 15:
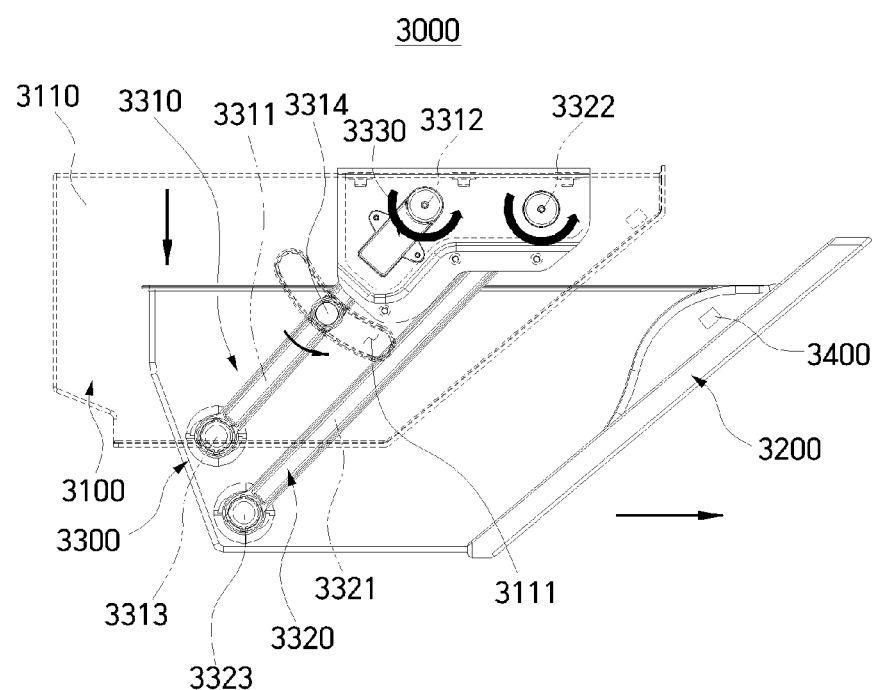
Figure 16:
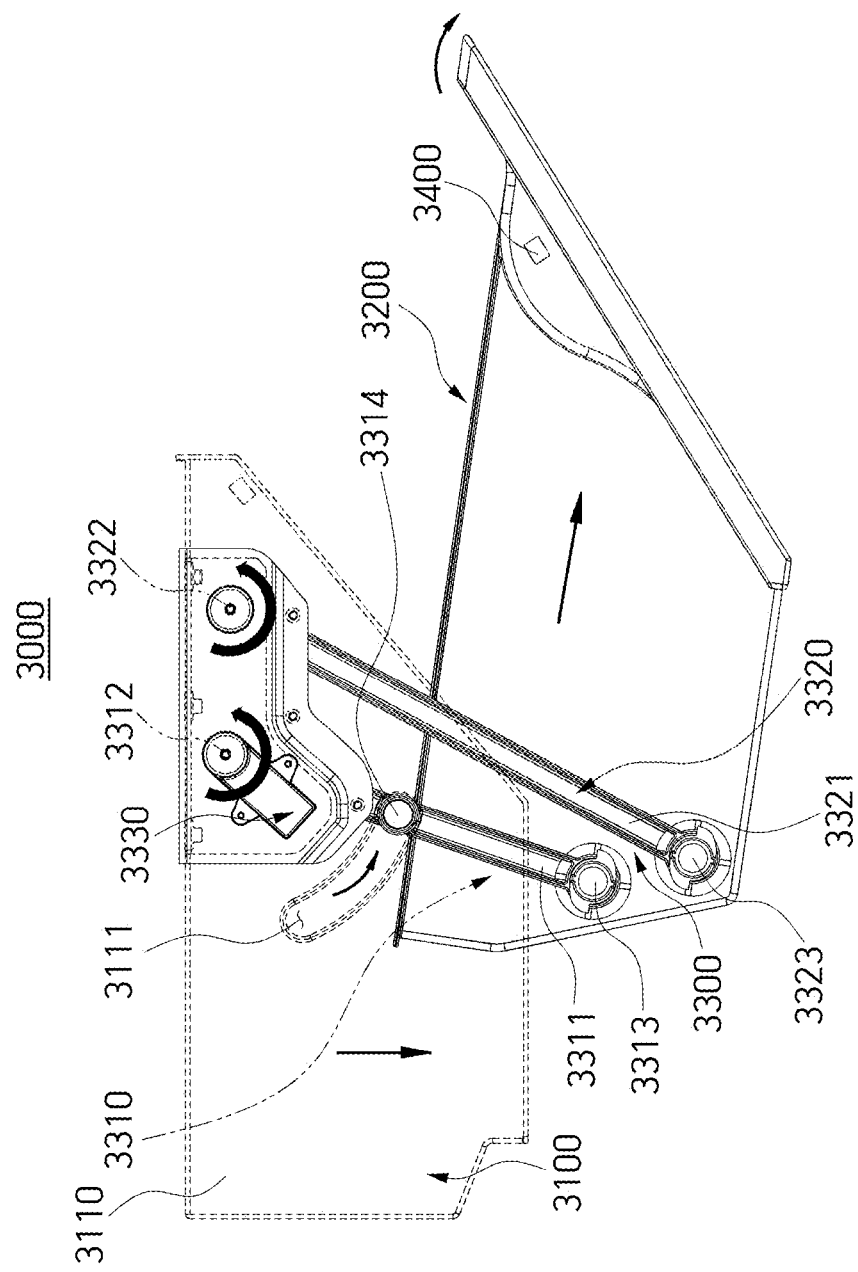

In detail, as illustrated in FIG. 12, the inclined surface 3333a is inclined upward from the one end to the other end of the upper surface of the support rod 3333. The inclined surface 3333a guides the cam protrusion 3332a of the cam 3332 so that the cam protrusion 3332a rotates in a left-right direction for the purpose of opening/closing.

The inclined surface 3333a guides the rotation direction of the cam 3332 while in contact with the cam protrusion 3332a.

The spring hole 3333b is a portion in which the spring 3334 is embedded.

A buckling prevention pin 3333c for preventing buckling of the spring 3334 protrudes axially from an inner central portion of the spring hole 3333b.

The buckling prevention pin 3333c may be formed integrally with a lower central part of the support rod 3333 or may have a detachable structure in which the buckling prevention pin 3333c may be separated from the lower central part of the support rod 3333.

An outer circumferential surface of the buckling prevention pin 3333c is spaced apart from an inner circumferential surface of the spring hole 3333b and has a smaller size than an inner circumferential surface of the spring 3334. Accordingly, the spring 3334 may be easily inserted into the buckling prevention pin 3333c.

The spring 3334 is a compression coil spring and is built in the support rod 3333. When the support rod 3333 slides, the spring 3334 provides an elastic force to the support rod 3333 through a tension/compression process.

After the support rod 3333 is moved downward by the cam protrusion 3332a of the cam 3332, when the cam protrusion 3332a passes through an inflexion point and returns to an initial position, the support rod 3333 is restored to an initial position by the spring 3334.

The role of the opening/closing auxiliary part 3330 of the glove box 3000 is summarized as follows.

When the housing is opened, the opening speed of the housing 3200 is attenuated as the cam protrusion 3332a moves toward a curved portion located at the other end of the inclined surface 3333a.

In contrast, when the housing 3200 is closed, as the cam protrusion 3332a passes through the curved portion and moves toward one end of the inclined surface 3333a, the opening speed of the housing 3200 is increased, and thus the occupant is assisted in easily closing the housing 3200.

Accordingly, the housing 3220 may easily close the storage space semi-automatically due to the opening/closing auxiliary part 3330.

The opening/closing auxiliary part 3330 illustrated in FIGS. 11 to 16 may be implemented not in the first link part 3310 but in the second link part 3320 or may be implemented in both the first and second link parts 3310 and 3320.

When the opening/closing auxiliary part 3330 is implemented in both the first and second link parts 3310 and 3320, an opening rotation speed of the housing 3200 can be more effectively controlled.

Fourth Embodiment

Figure 17:
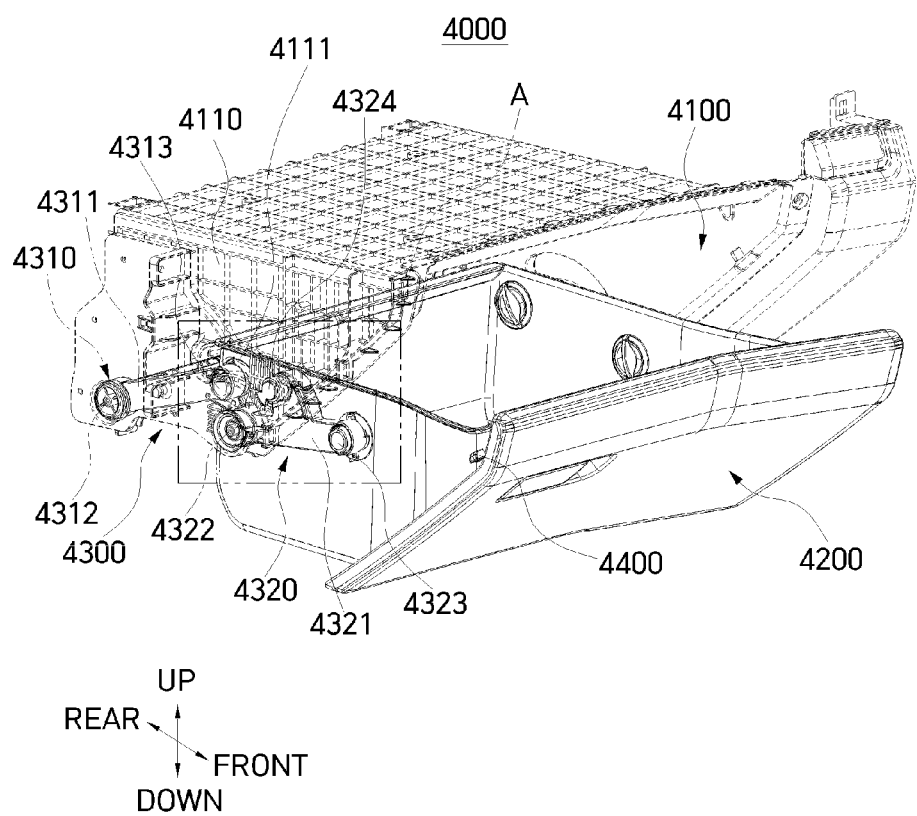
FIG. 17 is a perspective view illustrating a glove box according to a fourth embodiment of the present disclosure.
Figure 18:
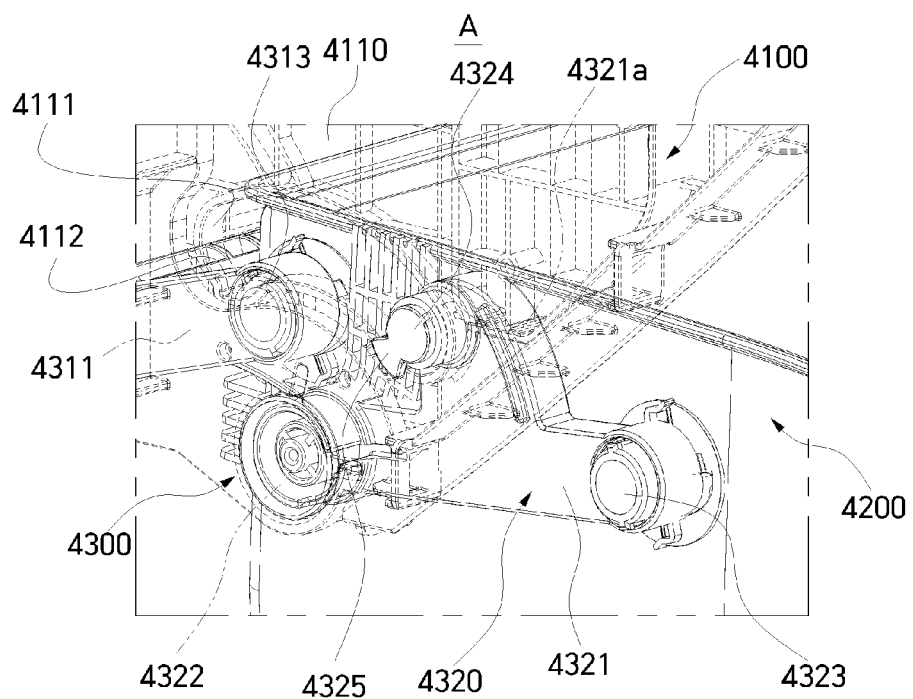
FIG. 18 is a partially enlarged view illustrating part A illustrated in FIG. 17.

FIG. 17 is a perspective view illustrating a glove box according to a fourth embodiment of the present disclosure, and FIG. 18 is a partially enlarged view illustrating part A illustrated in FIG. 17.

Referring to FIGS. 17 and 18, a glove box 4000 according to the fourth embodiment adopts a stopper 4324 for preventing left-right movement of a housing 4200 and controlling an open angle of the housing 4200.

The stopper 4324 may be transferred within a guide hole 4111 formed in a side wall 4110 of a cover 4100 and protrudes toward the cover 4100 on a section of a second connecting bar 4321 of a second link part 4320.

The stopper 4324 may include a seating protrusion 4325 that may be selectively seated in a seating groove 4112 located at a starting point and an end point of the guide hole 4111 when the housing 4200 is opened. The seating protrusion 4325 is formed in a polygonal shape. The seating protrusion 4325 may be located at a lower end of the stopper 4234 and may be seated in the seating groove 4112 when the stopper 4324 is transferred in the guide hole 4111.

The seating groove 4112 is implemented in a position in which the housing 4200 is closed to avoid assembly interference with the cover 4100 due to the shape of the seating protrusion 4325.

The seating protrusion 4325 extends from a lower part of the stopper 4324 and has a shape corresponding to the seating groove 4112. For example, as illustrated in FIG. 18, when the seating protrusion 4325 has a shorter upper surface than a lower surface and is inclined upward from two ends of the lower surface toward two ends of the upper surface, the seating groove 4112 is recessed in a shape corresponding to the seating protrusion 4325.

When the housing 4200 is opened or closed from the cover 4100, the seating protrusion 4325 is seated in the seating groove 4112 located at the starting point and the end point of the guide hole 4111, and thus the torsional rigidity of the glove box 4000 may be secured.

That is, the stopper 4324 may minimize shaking with respect to the transfer motion of the housing 4200 and continuously secure left-right torsional rigidity even when the glove box 4000 is in an open state.

Here, the seating protrusion 4325 may be made of a soft rubber material or a silicone material and is preferably made of a cushioning material such as a sponge.

As a result, the stopper 4324, from which the seating protrusion 4325 extends downward, may control an opening angle of the housing 4200, and at the same time, prevent the left-right movement of the housing 4200, thereby reinforcing the torsional rigidity.

Meanwhile, a transfer link 4300 itself has a structural feature that prevents the left-right movement of the housing 4200.

That is, a movement prevention step 4321a in contact with an inner side of the side wall 4110 that is a periphery of the guide hole 4111 protrudes from a central part of the second connecting bar 4321 configured in the second link part 4320 of the transfer link 4300.

When the second connecting bar 4321 has a "T" shape, the movement prevention step 4321a protrudes along a vertical section of an "I" shape within the "T" shape.

Further, the movement prevention step 4321a is provided at a gap between the movement prevention step 4321a and the second link part 4320 fastened between the cover 4100 and the housing 4200 and thus may have a thickness corresponding to the gap.

Even when the housing 4200 is opened, the movement prevention step 4321a may be detached from or attached to a position that is covered by the cover 4100 and not exposed to the outside.

The stopper 4324, in which the seating protrusion 4325 extends downward, and the movement prevention step 4321a do not deviate from the cover 4100 in an operation section of the transfer link 4300, and thus the housing 4200 may continuously maintain left-right stiffness during an opening motion of the housing 4200.

The glove box 4000 according to the fourth embodiment as illustrated in FIGS. 17 and 18 is merely one embodiment, and the stopper 4234 and the movement prevention step 4321a may be located not in the second link part 4320 but in a first link part 4310 or may be located in both the first and second link parts 4310 and 4320.

As another example, the stopper 4234 and the movement prevention step 4321a may be located not in the transfer link 4300 but between the cover 4100 and the housing 4200, thereby preventing left-right movement of the housing 4200 and securing the torsional rigidity.

In this case, the stopper 4324 may protrude to the cover 4100 from a rotation protrusion (not illustrated) separately protruding from an outer surface of the housing 4200 and thus may be transferred in the guide hole 4111 of the side wall 4110.

Fifth Embodiment

Figure 19:
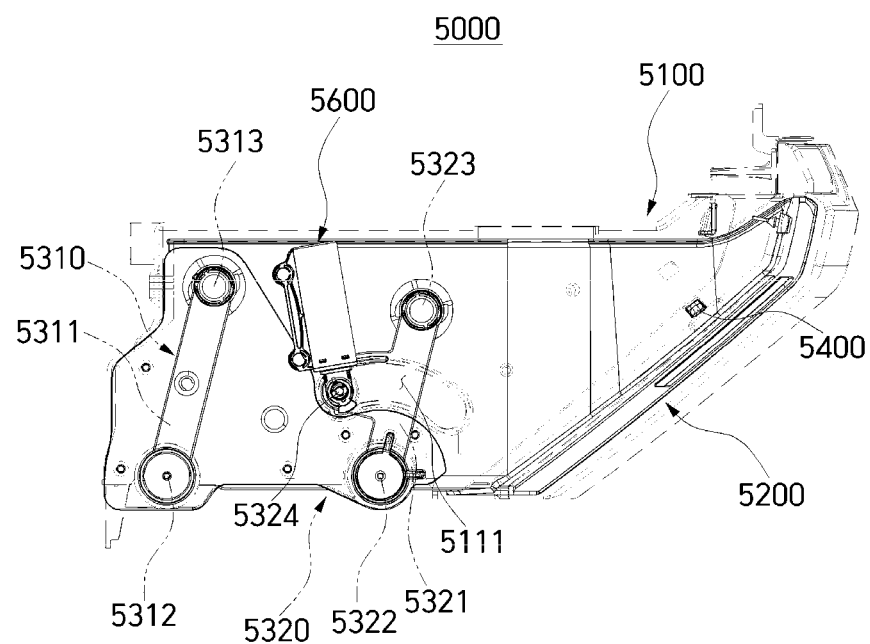
FIG. 19 is a side view illustrating a glove box according to a fifth embodiment of the present disclosure.
Figure 20:
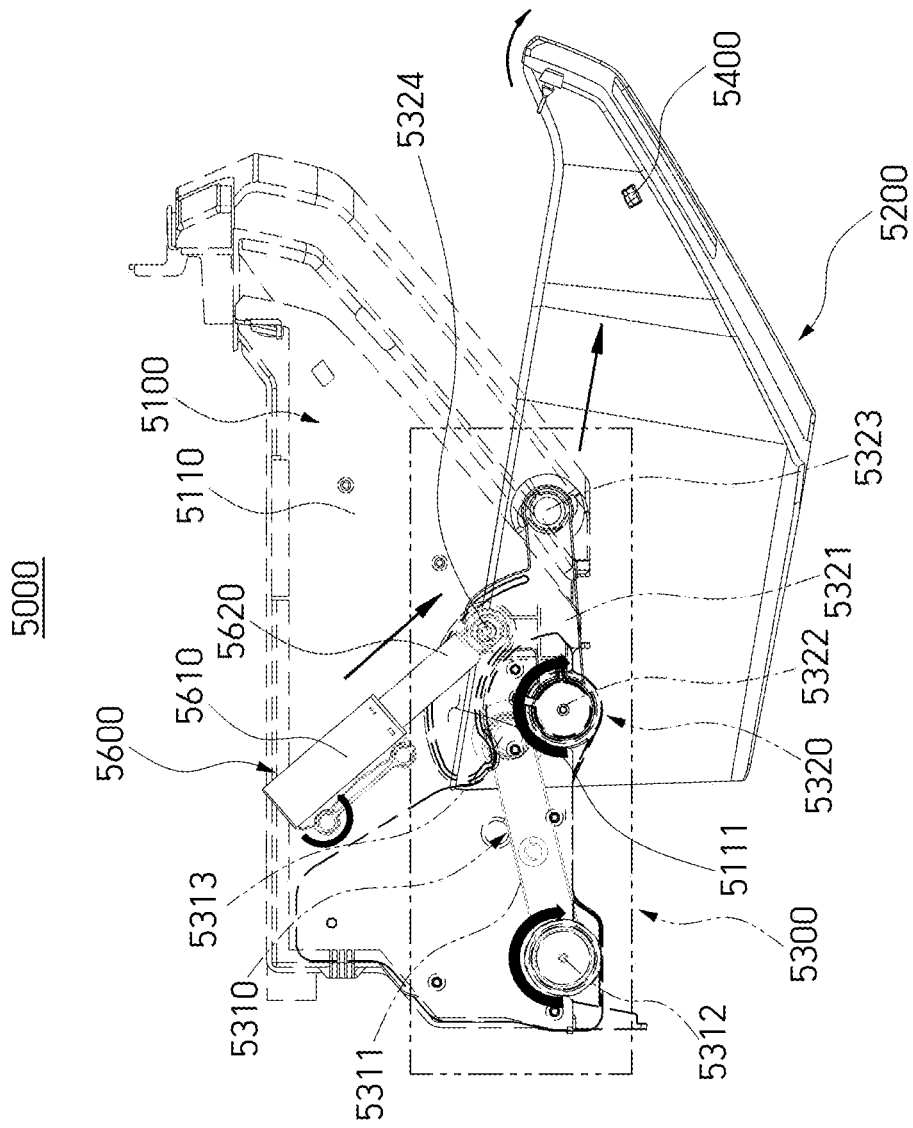
FIG. 20 is a schematic operational diagram illustrating an opening/closing structure of the glove box according to the fifth embodiment of the present disclosure.

FIG. 19 is a side view illustrating a glove box according to a fifth embodiment of the present disclosure, and FIG. 20 is a schematic operational diagram illustrating an opening/closing structure of the glove box according to the fifth embodiment of the present disclosure.

Referring to FIGS. 19 and 20, a glove box 5000 according to the fifth embodiment has a structure that, when a housing 5200 operates non-linearly, prevents a speed from increasing as a rotational slope becomes greater at an end point than at an initial point.

To this end, the glove box 5000 includes a cover 5100, the housing 5200, transfer links 5300, a locking member 5400, and a damper 5600.

The cover 5100 is built in a dashboard of a vehicle in a state in which a front surface thereof is open. An arch-shaped guide hole 5111 extending from the top to the bottom is formed in a side wall 5110 of the cover 5100.

The housing 5200 may be accommodated in a state in which one open surface thereof is covered by the cover 5100, and an open front surface of the cover 5100 is transferred along a rotational trajectory of the guide hole 5111 to open or close a storage space.

The transfer links 5300 are arranged between two outer ends of the housing 5200 and two inner ends of the cover 5100 and transfer the housing 5200 along the rotational trajectory of the guide hole 5111.

The locking member 5400 is connected between the cover 5100 and the housing 5200 to serve to selectively lock or unlock the housing 5200 to or from the cover 5100.

The damper 5600 is disposed between the cover 5100 and the housing 5200 to attenuate a speed when the housing 5200 is rapidly inclined through an operation of a piston.

The damper 5600 includes a damper body 5610 and a piston rod 5620.

The damper body 5610 is rotatably connected to an upper end of the side wall 5110 of the cover 5100.

The piston rod 5620 is built in the damper body 5610 in a stretchable manner. One end of the piston rod 5620 is connected to an inside of the damper body 5610 and the other end of the piston rod 5620 is connected to a guide protrusion 5324 of a second connecting bar 5321.

When the occupant unlocks the locking member 5400 and then separates the housing 5200 from the cover 5100 to open the storage space, the housing 5200 rotates forward due to the transfer links 5300, and thus the storage space is opened.

In this case, as the piston rod 5620 of the damper 5600 is stretched downward in accordance with the movement of the guide protrusion 5324, the damper 5600 limits a rapid change in the inclination of the housing 5200 and further prevents a rapid increase in a descending speed.

Meanwhile, the damper 5600 illustrated in FIGS. 19 and 20 is rotatably disposed at the upper end of the side wall 5110 of the cover 5100.

However, the glove box 5000 in the fifth embodiment is not limited thereto, and the damper 5600 may be rotatably disposed at a lower end of the side wall 5110 of the cover 5100.

For example, the damper body 5610 may be connected to any one of a first link part 5310 and a second link part 5320, and the piston rod 5620 may be connected to a lower end of an outer surface of the housing 5200.

When the damper body 5610 is connected to the first link part 5310, the piston rod 5620 may be connected to the lower end of the outer surface of the housing 5200.

In this case, a separate rotation protrusion (not illustrated) protruding toward the cover 5100 may be formed at the lower end of the outer surface of the housing 5200.

The rotation protrusion may be transferred along a trajectory of the guide hole 5111 and may be connected to the piston rod 5620.

As another example, the damper body 5610 may be connected to the first link part 5310, and the piston rod 5620 may be connected to the guide protrusion 5324 and may be stroked.

As still another example, when the damper body 5610 is connected to a second hinge shaft 5322 of the second link part 5320, the piston rod 5620 may be connected to a separate rotation protrusion (not illustrated) protruding from the lower end of the outer surface of the housing 5200 toward the cover 5100 and may be stroked.

As yet another example, the damper 5600 may connect a front part of the cover 5100 and a front part of the housing 5200. In this case, the damper 5600 may be connected to any one of upper and lower ends of the front part of the cover 5100 and may be connected to any one of upper and lower ends of the front part of the housing 5200 in proportion thereto.

Sixth Embodiment

Figure 21:
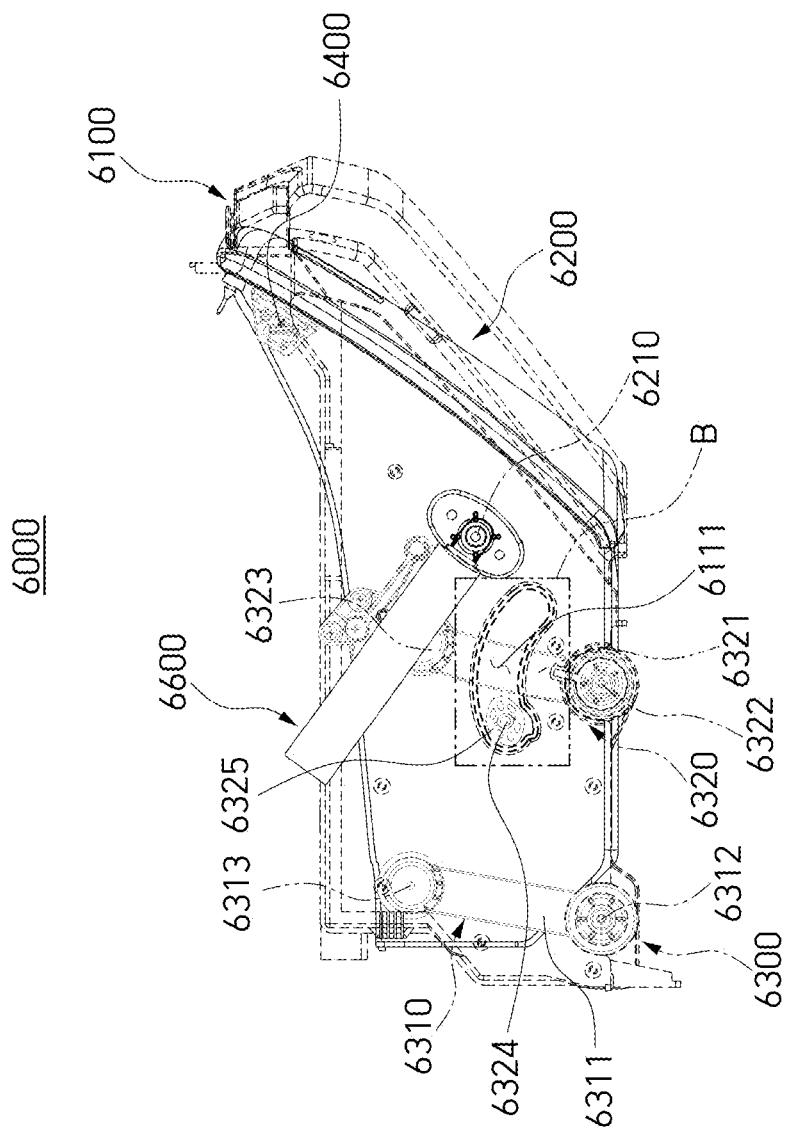
FIG. 21 is a side view illustrating a glove box according to a sixth embodiment of the present disclosure.
Figure 22:
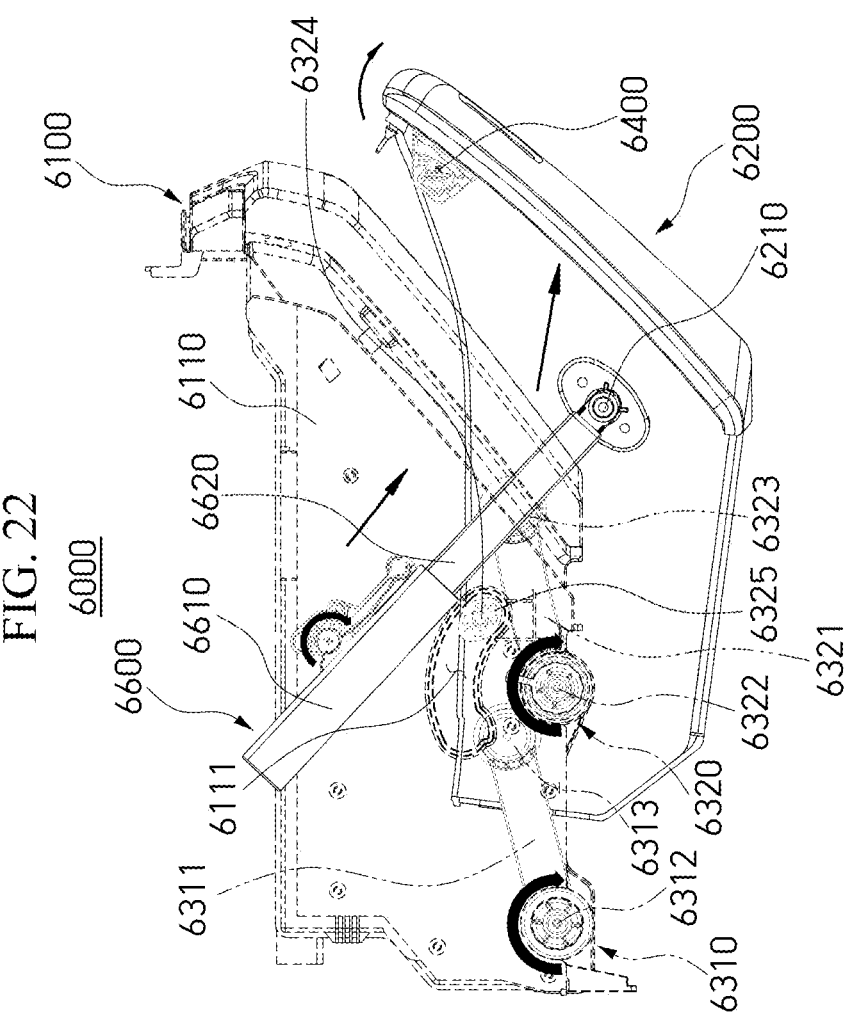
FIG. 22 is a schematic operational diagram illustrating an opening/closing structure of the glove box according to the sixth embodiment of the present disclosure.
Figure 23:
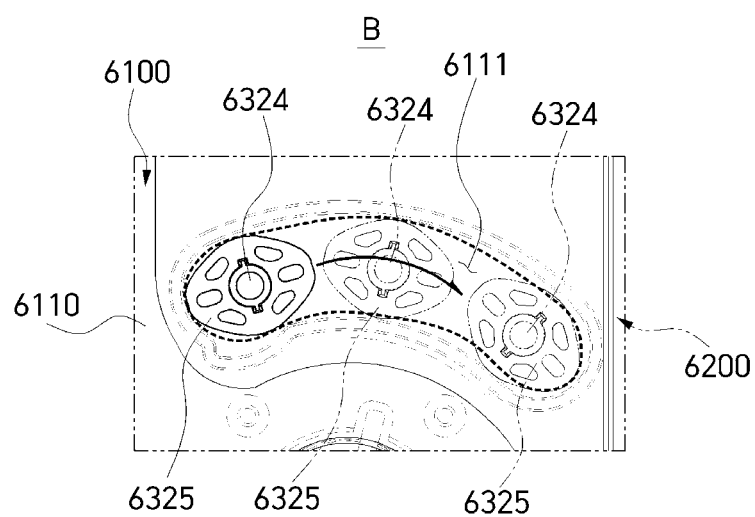
FIG. 23 is a partially enlarged view illustrating part B illustrated in FIG. 21.

FIG. 21 is a side view illustrating a glove box according to a sixth embodiment of the present disclosure, FIG. 22 is a schematic operational diagram illustrating an opening/ closing structure of the glove box according to the sixth embodiment of the present disclosure, and FIG. 23 is a partially enlarged view illustrating part B illustrated in FIG. 21.

Referring to FIGS. 21 to 23, a glove box 6000 in the sixth embodiment has a main feature that an open shock that may occur while the housing 6200 is opened is absorbed through an elastic body 6325 surrounding a stopper 6324.

The glove box 6000 includes a cover 6100, the housing 6200, transfer links 6300, and a locking member 6400.

The cover 6100 is built in a dashboard of a vehicle in a state in which a front surface thereof is open and includes a rod connection part 6210 disposed on a front portion of an outer side of a side wall 6110 and an arch-shaped guide hole 6111 extending from an upper portion to a lower portion of the outer side of the side wall 6110.

The guide hole 6111 is formed so that the width of an end point (front side) is smaller than the width of a start point (rear side) on a rotational trajectory. The elastic body 6325 that varies toward an end point of the guide hole 6111 to attenuate an opening speed of the housing 6200 is located on a trajectory of the guide hole 6111.

The guide hole 6111 is variably configured to maintain a gap between the guide hole 6111 and the elastic body 6325 in a state in which the housing 6200 is closed and to overlap the elastic body 6325 in a state in which the housing 6200 is open. In this case, the elastic body 6325 enters and overlaps the end point of the guide hole 6111. That is, the elastic body 6325 overlaps the guide hole 6111 to reduce the opening speed of the housing 6200 and absorb the open shock. This will be described in detail below.

The housing 6200 may be accommodated in a state in which one open surface thereof is covered by the cover 6100.

The housing 6200 selectively opens or closes the open front surface of the cover 6100.

The transfer links 6300 are arranged between two outer ends of the housing 6200 and two inner ends of the cover 6100 and transfer the housing 6200 along the rotational trajectory of the guide hole 6111.

The transfer links 6300 include first and second link parts 6310 and 6320 connecting the cover 6100 and the housing 6200 while spaced apart from each other.

Ends of the first link part 6310 and the second link part 6320 are rotatably connected to an inner lower part of the cover 6100.

The other ends of the first link part 6310 and the second link part 6320 are rotatably connected to an outer upper part of the housing 6200.

Support points of the first link part 6310 and the second link part 6320 are arranged at a lower end of the cover 6100.

The locking member 6400 is disposed at an upper end of the first link part 6310 and the second link part 6320, and thus the stability of the housing 6200 in a locked state is improved.

The first link part 6310 includes a first connecting bar 6311, a first hinge shaft 6312, and a first movable shaft 6313.

The first connecting bar 6311 is formed in the shape of a linear bar and has two ends rotatably mounted on the side wall 6110 of the cover 6100 within a range of an acute angle.

The first hinge shaft 6312 connects one end of the first connecting bar 6311 and an inner lower part of the cover 6100.

The first movable shaft 6313 connects the other end of the first connecting bar 6311 and an outer upper part of the housing 6200.

The second link part 6320 includes a second connecting bar 6321, a second hinge shaft 6322, a second movable shaft 6323, and a stopper 6324.

The second connecting bar 6321 is mounted and rotated at the same angle as or a different angle from the first connecting bar 6311.

The second connecting bar 6321 has a central part extending rearward between two ends thereof in a lengthwise direction. The stopper 6324 protrudes from such a central part.

The stopper 6324 may be slidably coupled to the guide hole 6111 formed in the side wall 6110 of the cover 6100. In this case, the stopper 6324 is surrounded by the elastic body 6325.

As illustrated in FIG. 23, since the guide hole 6111 has a variable width, a predetermined gap between the guide hole 6111 and the elastic body 6325 is maintained in a state in which the housing 6200 is closed. Accordingly, when the housing 6200 is initially opened, a falling speed of the housing 6200 is not reduced due to the elastic body 6325.

However, since the width of the guide hole 6111 is reduced in a direction toward the end point, the gap between the guide hole 6111 and the elastic body 6325 is reduced after the elastic body 6325 has passed through a predetermined section, and thus the elastic body 6325 and the guide hole 6111 may overlap each other.

Accordingly, the rotation speed of the transfer links 6300 is reduced, and as a result, the opening speed of the housing 6200 is reduced due to the overlap between the elastic body 6325 and the guide hole 6111.

The second hinge shaft 6322 is disposed to be parallel to the first hinge shaft 6312 at the same time while spaced apart from the first hinge shaft 6312. The second hinge shaft 6322 connects one end of the second connecting bar 6321 and the inner lower part of the cover 6100.

The second movable shaft 6323 connects the other end of the second connecting bar 6321 and the outer upper part of the housing 6200.

The locking member 6400 is connected between the cover 6100 and the housing 6200 to serve to selectively lock or unlock the housing 6200 to or from the cover 6100.

The glove box 6000 may further include a damper 6600 for correcting the opening speed of the housing 6200.

The damper 6600 includes a damper body 6610 and a piston rod 6620.

The damper body 6610 is rotatably connected to an outer wall of the housing 6200.

The piston rod 6620 connects the damper body 6610 and the rod connection part 6210. The piston rod 6620 is stroked from the damper body 6610 to control the opening speed of the housing 6200.

Meanwhile, the stopper 6324 may also protrude from a fastening surface between the housing 6200 and the cover 6100. The stopper 6324 in this case may protrude from the housing 6200 toward the cover 6100 and may be transferred in the guide hole 6111.

In this case, the elastic body 6325 for correcting the rotational force of the housing 6200 may be snap-fit-fastened to the stopper 6324 while surrounding the stopper 6324.

Seventh Embodiment

Figure 24:
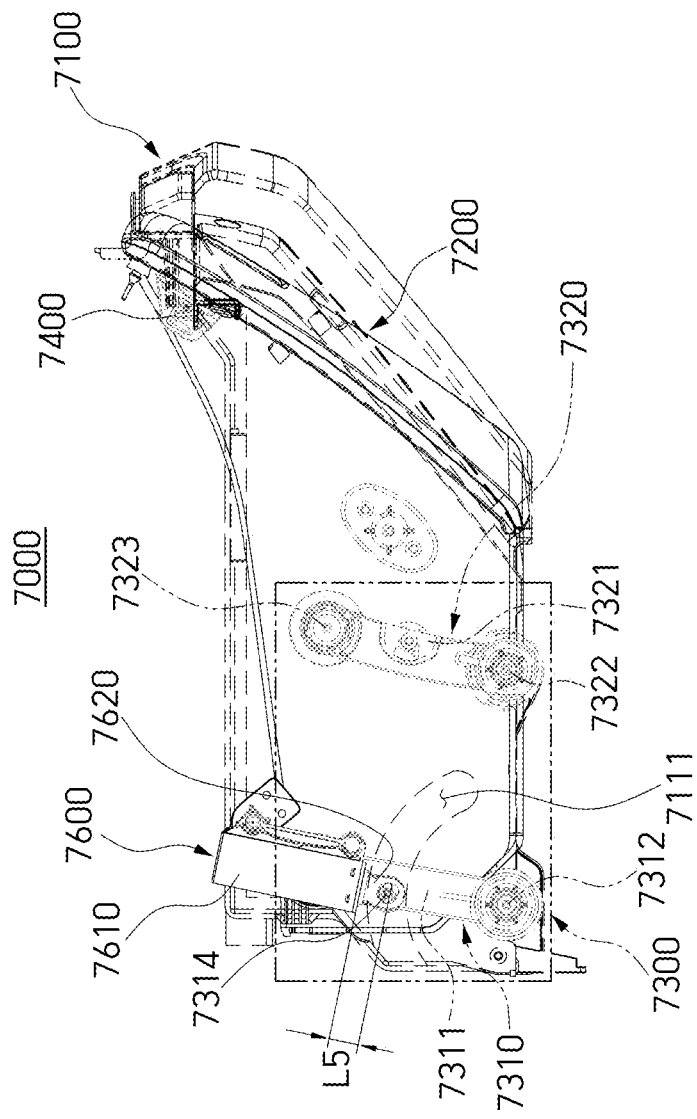
FIG. 24 is a side view illustrating a glove box according to a seventh embodiment of the present disclosure.
Figure 25:
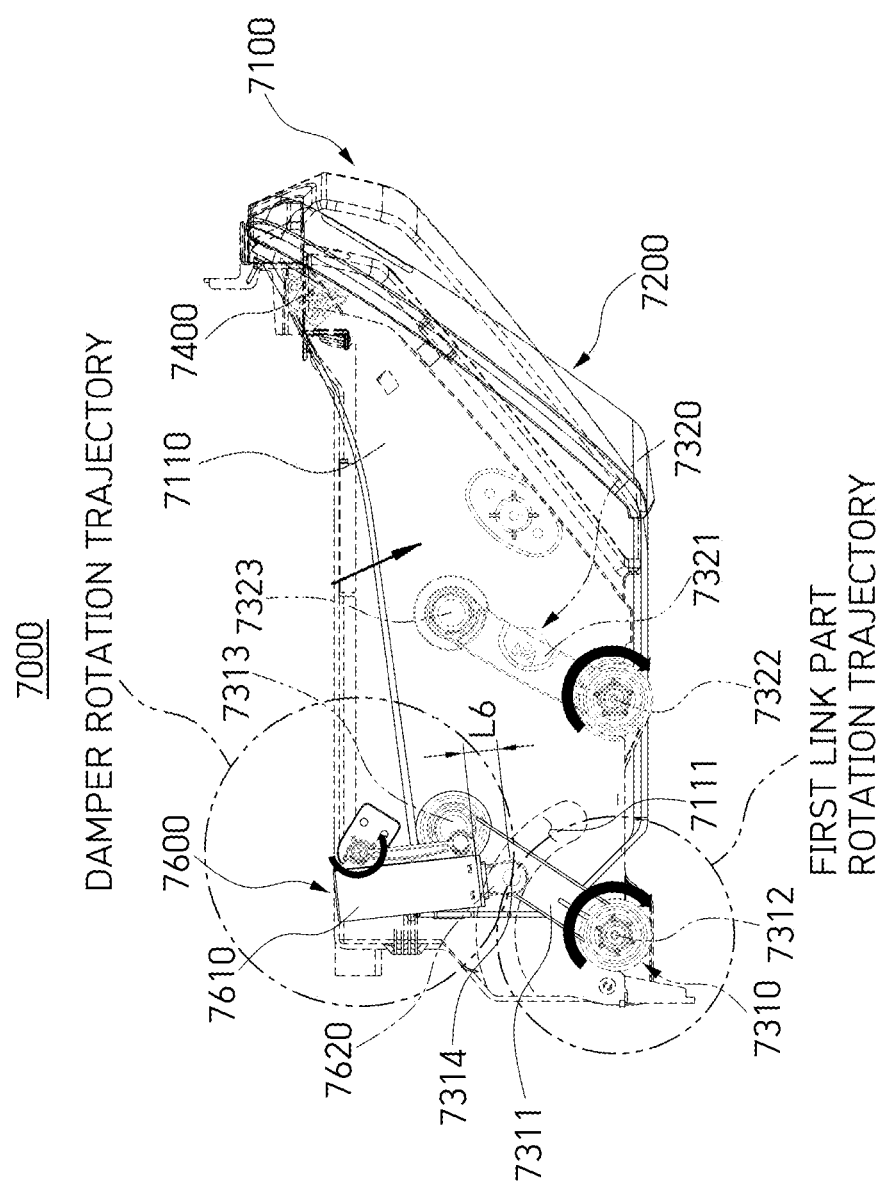
FIGS. 25 and 26 are schematic operational diagrams illustrating an opening/closing structure of the glove box according to the seventh embodiment.
Figure 26:
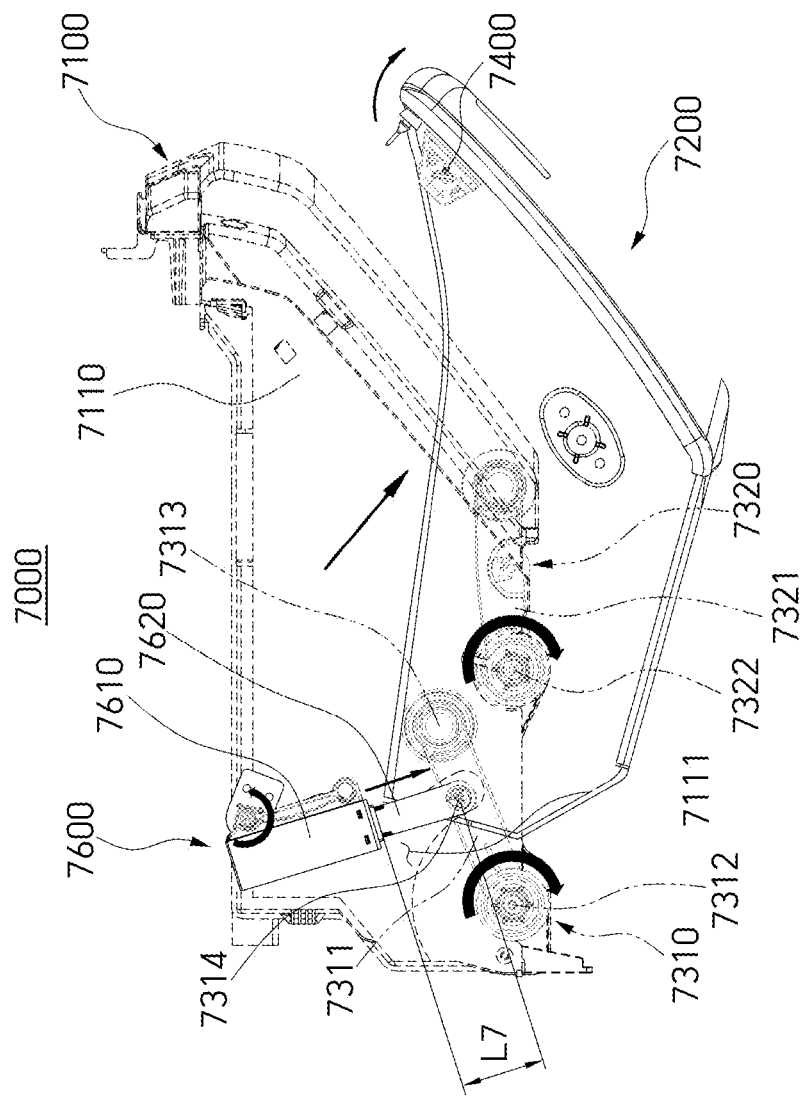

FIG. 24 is a side view illustrating a glove box according to a seventh embodiment of the present disclosure, and FIGS. 25 and 26 are schematic operational diagrams illustrating an opening/closing structure of the glove box according to the seventh embodiment.

Referring to FIGS. 24 to 26, a glove box 7000 according to the seventh embodiment includes a cover 7100, a housing 7200, transfer links 7300, and a damper 7600.

The cover 7100 is built in a dashboard of a vehicle in a state in which a front surface thereof is open. An arch-shaped guide hole 7111 extending from the top to the bottom is formed in a side wall 7110 of the cover 7100.

The housing 7200 may be accommodated in a state in which one open surface thereof is covered by the cover 7100.

The housing 7200 opens or closes a storage space as the open front surface of the cover 7100 is transferred along a rotational trajectory of the guide hole 7111.

The transfer links 7300 are arranged between two outer ends of the housing 7200 and two inner ends of the cover 7100 and transfer the housing 7200 along the rotational trajectory of the guide hole 7111.

The damper 7600 is connected between the cover 7100 and the transfer link 7300 to attenuate a speed when the housing 7200 is rapidly inclined through an operation of a piston.

In this case, the damper 7600 only rotates in place without expansion/contraction of the length thereof in a closed state or a preset initial open section of the housing 7200.

However, the damper 7600 may generate a damping force through an increase in stroke in a preset terminal open section.

The damper 7600 includes a damper body 7610 and a piston rod 7620.

The damper body 7610 is rotatably connected onto the side wall 7110 of the cover 7100.

The piston rod 7620 is connected between the damper body 7610 and the side wall 7110 of the cover 7100 and is stroked from the damper body 7610 to control an opening speed of the housing 7200.

When the housing 7200 is opened, the damper 7600 controls a rotation speed increasing from a rotation start point to a rotation termination point so that the rotation speed is maintained within a preset range.

For example, the damper 7600 only rotates in place at a mounted position so that a damping force is not generated in a section in which the housing 7200 rotates smoothly, and there is no increase in the stroke of the piston rod 7620.

In contrast, the damper 7600 has a structure in which the damping force is generated as the stroke of the piston rod 7620 starts to increase in a section in which the opening speed rapidly increases as the housing 7200 is opened after passing through a certain section.

In this case, when the housing 7200 is in a closed state or an initial open state, the strokes L5 and L6 of the piston rod 7620 may be about 10 mm, and the stroke L7 of the piston rod 7620 in a state in which the housing 7200 is completely open may be 40 mm.

According to the present disclosure, the glove box can have a maximized storage space and provide improved convenience of use through various operating mechanisms.

In particular, the glove box can provide improved quality compared to the related art, and furthermore, can also secure structural safety.

The present disclosure is not limited to the above-described embodiments and can be variously modified and implemented without departing from the allowable scope of the technical spirit of the present disclosure.

What is claimed is:

1. A glove box comprising:
a cover embedded in a dashboard of a vehicle in a state in which a front side of the cover is open;
a housing accommodated in a state in which one open surface of the housing is covered by the cover and configured to selectively open or close the front surface of the cover through a preset rotational trajectory;
a plurality of transfer links each arranged between one of two outer ends of the housing and a corresponding one of two inner ends of the cover and configured to provide a rotational trajectory of the housing; and
an elastic member configured to correct rotational forces of the transfer links,
wherein the plurality of transfer links includes a first link part and a second link part each having a first end rotatably connected to an inner lower portion of the cover and a second end rotatably connected to an outer upper portion of the housing, and
the first link part and the second link part are spaced apart from each other on a same side of the housing and have the same length and the same mounting angle as each other.

2. The glove box of claim 1, wherein the first and second ends of the first link part and the second link part are collinearly mounted on the cover.

3. The glove box of claim 1, wherein the first link part includes:
a first connecting bar;
a first hinge shaft connecting a first end of the first connecting bar and the inner lower portion of the cover;
a first movable shaft connecting a second end of the first connecting bar and the outer upper portion of the housing; and
a link fixing protrusion protruding in a lengthwise direction of the first connecting bar and connecting the first connecting bar to one end of the elastic member.

4. The glove box of claim 3, wherein the second link part includes:
a second connecting bar mounted and rotated at the same angle as the first connecting bar;
a second hinge shaft collinearly disposed apart from the first hinge shaft and configured to connect a first end of the second connecting bar and the inner lower portion of the cover; and
a second movable shaft connecting a second end of the second connecting bar and the outer upper portion of the housing.

5. The glove box of claim 4, wherein a central portion extending rearward is formed between the first and second ends of the second connecting bar in a lengthwise direction, and
a guide protrusion protruding laterally to be slidably coupled to a guide hole, which is included in a side wall of the cover and has an arch shape, is disposed on the central portion.

6. The glove box of claim 4, wherein the first ends of the first link part and the second link part rotate in place in the same manner as each other, and
the second ends of the first link part and the second link part move and rotate in an arch shape in the same manner as each other.

7. A glove box comprising:
a cover having a space on a dashboard of a vehicle in a state in which a front side of the cover is open;
a housing located in the space of the cover in a state in which one open surface of the housing is covered, having a storage space therein, and configured to selectively open or close the front side of the cover through a preset rotational trajectory;

a plurality of transfer links each arranged between one of two outer ends of the housing and a corresponding one of two inner ends of the cover, the plurality of transfer links being spaced apart from each other on a same side of the housing and having the same length and the same mounting angle as each other; and a locking member connected between the cover and the housing and configured to selectively lock the housing from the cover.

8. The glove box of claim 7, further comprising an elastic member having a first end coupled to the first link part and a second end coupled to the cover and configured to correct rotational forces of the transfer links.

9. The glove box of claim 8, wherein the first link part includes:

a first connecting bar;

a first hinge shaft connecting a first end of the first connecting bar and an inner lower portion of the cover;

a first movable shaft connecting a second end of the first connecting bar and an outer upper portion of the housing; and a link fixing protrusion protruding in a lengthwise direction of the first connecting bar and connecting the first connecting bar to the first end of the elastic member, and wherein the cover includes a cover fixing protrusion protruding from an inner surface of the cover between the first link part and the second link part and connected to the second end of the elastic member.

10. The glove box of claim 9, wherein the second link part includes:

a second connecting bar mounted and rotated at a different angle from the first connecting bar;

a second hinge shaft collinearly disposed apart from the first hinge shaft and connecting a first end of the second connecting bar to the inner lower portion of the cover; and a second movable shaft connecting a second end of the second connecting bar to the outer upper portion of the housing, a central portion extending rearward is disposed between the first and second ends of the second connecting bar in a lengthwise direction, and a guide protrusion protruding laterally to be slidably coupled to a guide hole, which is included in a side wall of the cover and has an arch shape, is disposed on the central portion.

* * * * *